United States Patent [19]

Kiriyama et al.

[11] Patent Number: 4,568,506

[45] Date of Patent: Feb. 4, 1986

[54] PROCESS FOR PRODUCING AN ASSEMBLY OF MANY FIBERS

[75] Inventors: Tsutomu Kiriyama; Susumu Norota; Yasuhiko Segawa; Shingo Emi; Tadasi Imoto; Toshinori Azumi, all of Iwakuni, Japan

[73] Assignee: Teijin Limited, Osaka, Japan

[21] Appl. No.: 500,229

[22] Filed: Jun. 1, 1983

Related U.S. Application Data

[62] Division of Ser. No. 288,202, Jul. 29, 1981, Pat. No. 4,414,276.

[30] Foreign Application Priority Data

| | | | |
|---|---|---|---|
| Jul. 29, 1980 | [JP] | Japan | 55-103067 |
| Sep. 19, 1980 | [JP] | Japan | 55-129056 |
| Oct. 23, 1980 | [JP] | Japan | 55-147547 |

[51] Int. Cl.[4] ........................ D01D 5/32; D01D 5/40; D01D 4/02; B29C 47/30

[52] U.S. Cl. ...................................... 264/171; 264/25; 264/176 F; 264/210.5; 264/210.8; 264/290.5; 264/DIG. 75; 425/72 S; 425/192 S; 425/198; 425/199; 425/206; 425/378 S; 425/382.2

[58] Field of Search ........ 264/176 F, 210.8, DIG. 75, 264/171, 25, 210.5, 290.5; 425/382.2, 72 S, 192 S, 198, 199, 206, 378 S

[56] References Cited

U.S. PATENT DOCUMENTS

| | | | |
|---|---|---|---|
| 3,227,664 | 1/1966 | Blades et al. | 264/41 |
| 3,237,245 | 3/1966 | Nonami et al. | 425/382.2 X |
| 3,272,901 | 9/1966 | Sims | 428/374 |
| 3,406,427 | 10/1968 | Tsuji | 425/382.2 X |
| 3,413,683 | 12/1968 | Yelverton, Jr. | 425/382.2 X |
| 3,439,084 | 4/1969 | Ono et al. | 264/167 |
| 3,459,846 | 8/1969 | Matsui et al. | 425/382.2 X |
| 3,531,368 | 9/1970 | Okamoto et al. | 428/374 |
| 3,577,308 | 5/1971 | Drunen et al. | 428/374 |
| 3,608,148 | 9/1971 | Sluijters | 425/382.2 X |
| 3,681,189 | 8/1972 | Matsui et al. | 428/374 |
| 3,700,545 | 10/1972 | Matsui et al. | 428/374 |
| 3,709,971 | 1/1973 | Shimoda et al. | 264/171 X |
| 3,800,985 | 4/1974 | Grout et al. | 264/171 |
| 3,832,272 | 8/1974 | Hann | 428/399 |
| 3,860,685 | 1/1975 | Nakagawa et al. | 264/171 |
| 3,950,476 | 4/1976 | Fontijn | 264/171 |
| 3,954,928 | 5/1976 | Omori et al. | 428/105 |
| 3,968,307 | 7/1976 | Matsui et al. | 264/171 X |
| 3,992,499 | 11/1976 | Lee | 264/171 X |
| 4,045,529 | 8/1977 | Phillips et al. | 264/171 X |
| 4,121,012 | 10/1978 | Bockno | 428/374 |
| 4,186,168 | 1/1980 | Barbe et al. | 264/171 X |
| 4,248,577 | 2/1981 | Borg et al. | 264/171 |
| 4,307,054 | 12/1981 | Chion et al. | 264/171 |
| 4,355,075 | 10/1982 | Norota et al. | 428/397 |
| 4,399,084 | 8/1983 | Sagawa et al. | 264/176 F X |
| 4,414,276 | 11/1983 | Kiriyama et al. | 264/176 F X |

FOREIGN PATENT DOCUMENTS

| | | |
|---|---|---|
| 0006704 | 1/1980 | European Pat. Off. . |
| 0017423 | 10/1980 | European Pat. Off. . |

*Primary Examiner*—Philip Anderson

*Attorney, Agent, or Firm*—Wenderoth, Lind & Ponack

[57] ABSTRACT

An assembly of fibers composed of at least two dissimilar fiber-forming polymers, characterized by the fact that (1) it consists of numerous fibers, (2) at least 90% of said fibers have a non-circular cross-sectional shape, (3) the cross-sections of at least 50% of said fibers differ from each other in at least one of shape and size, and (4) at least 50% of said fibers each have in their cross-section taken at right angles to the fiber axis at least two side-by-side coalesced blocks of at least two dissimilar fiber-forming polymer phases with at least a part thereof being exposed to the peripheral surface of the fiber, at least one of the number, shape and size of the blocks varying from fiber to fiber. The assembly of fibers can be produced by extruding a molten macroblend composed of many molten phases of at least two dissimilar fiber-forming polymers through a mesh spinneret having many small openings; and taking up the extrudates from the small openings while cooling them by supplying a cooling fluid to the extrusion surface of said spinneret or to its neighborhood, whereby said extrudates are converted into numerous separated fine fibrous streams and solidified.

12 Claims, 36 Drawing Figures

Fig. 1-a
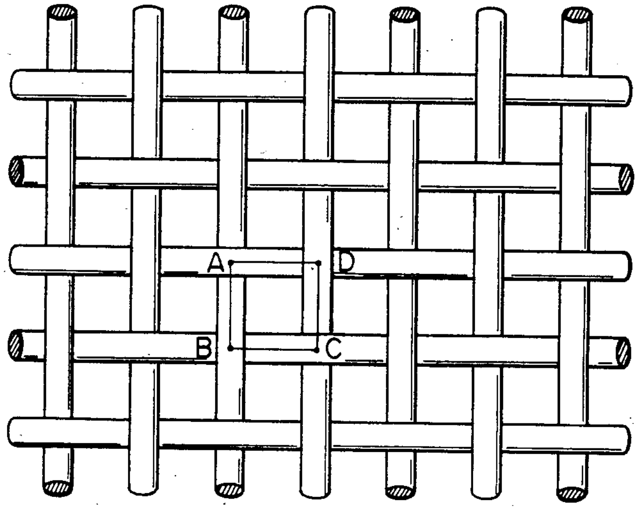
Fig. 1-b
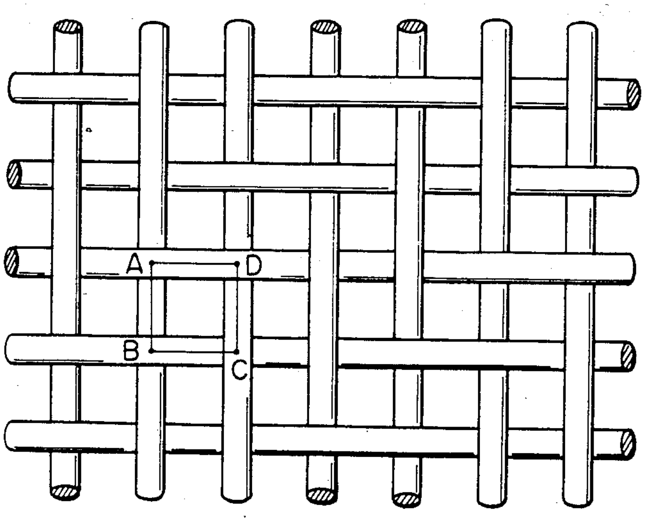

Fig. 1-c
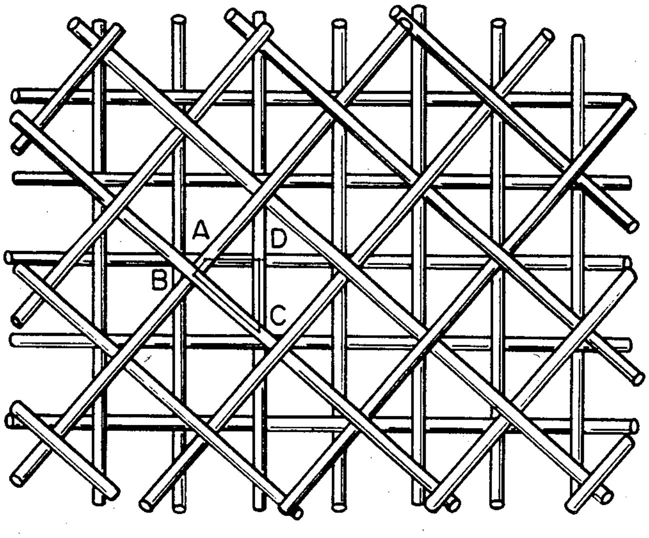
Fig. 1-d
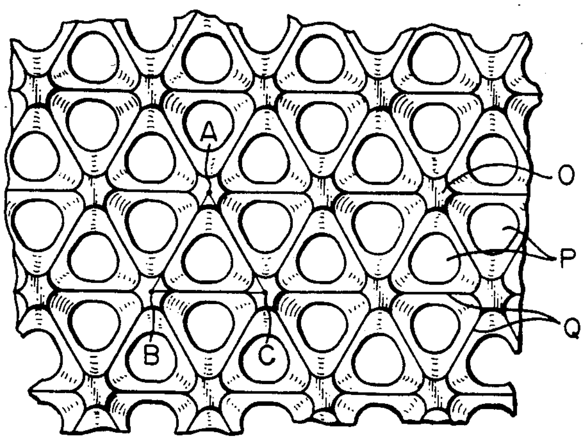

Fig. 2
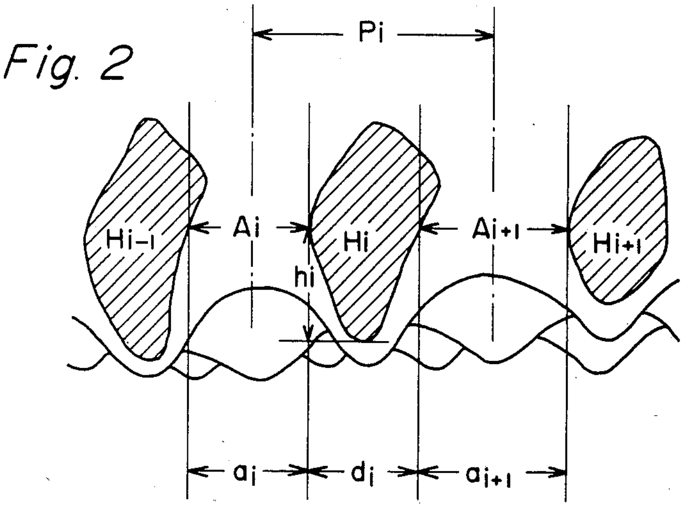
Fig. 3-a
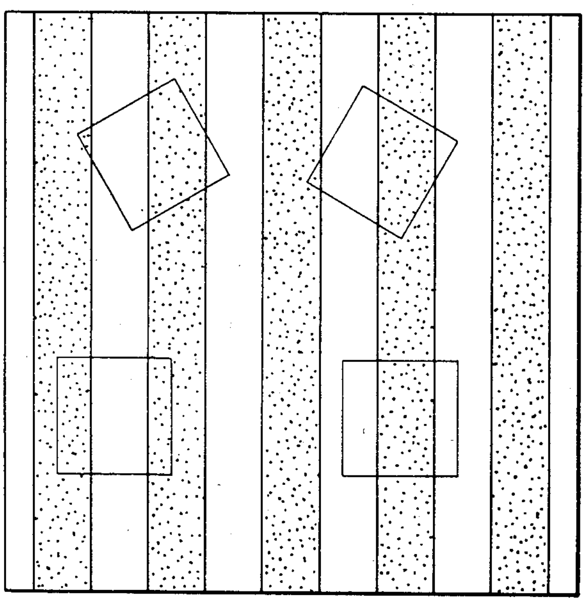

Fig. 3-b
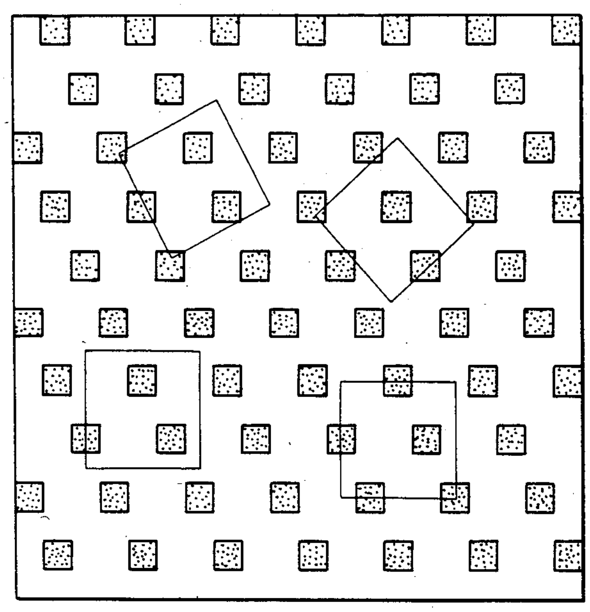
Fig. 3-c
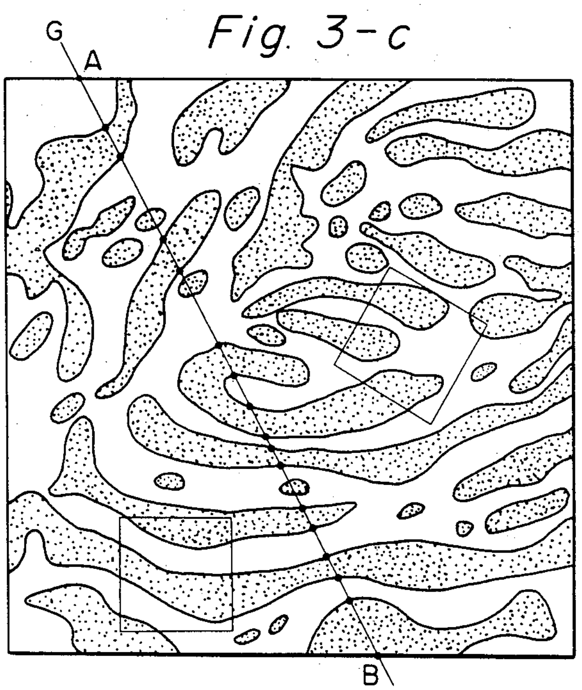

Fig. 6-a
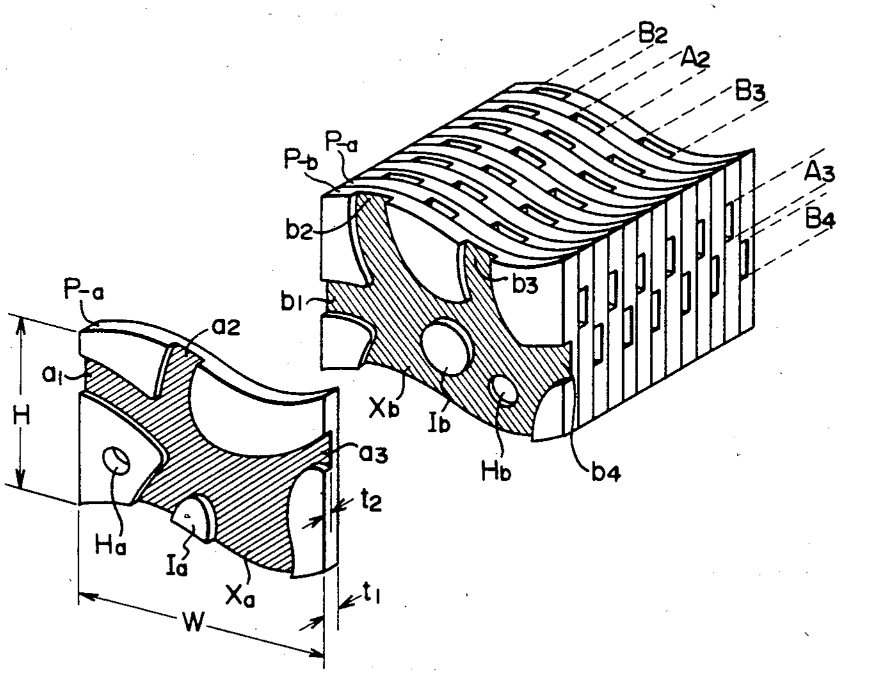

Fig. 6-b
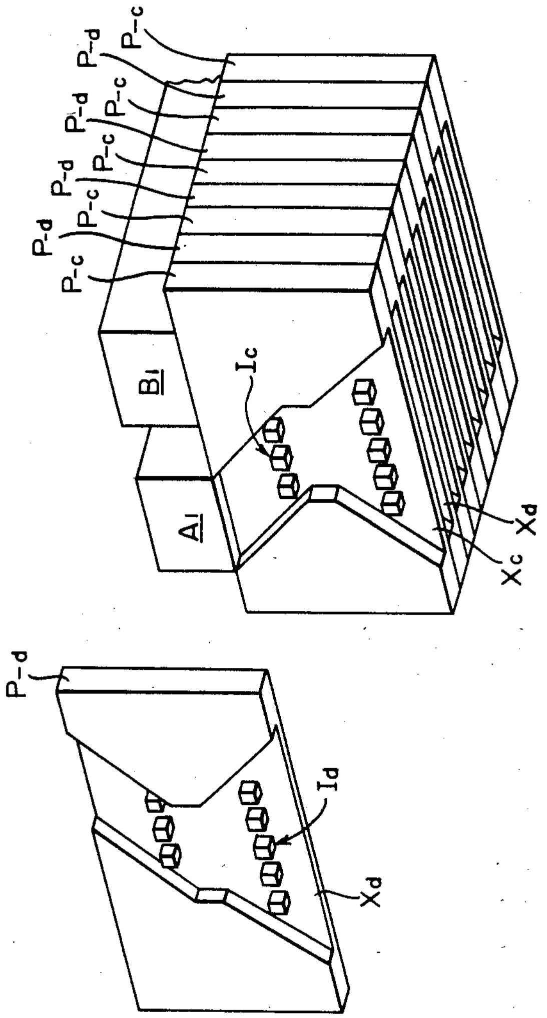

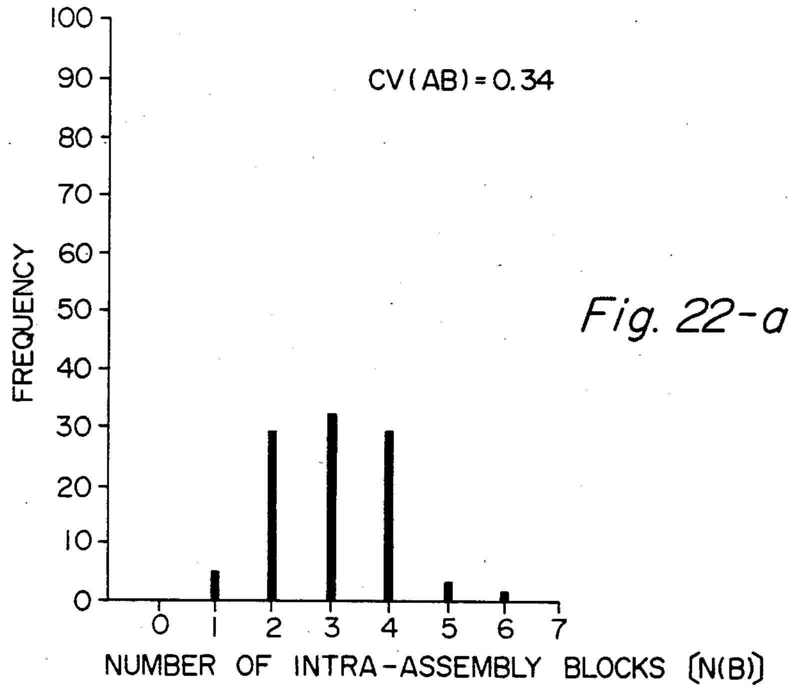
Fig. 22-a
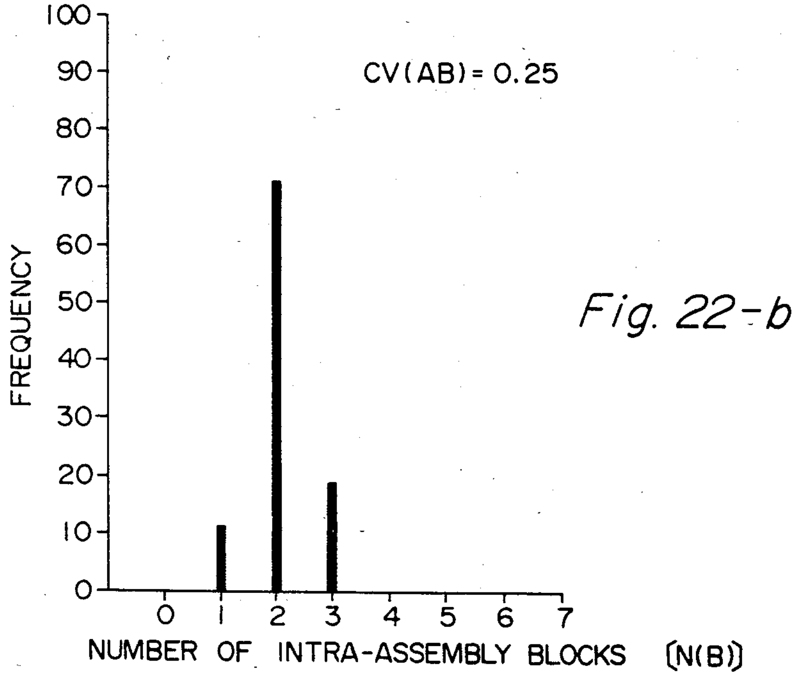
Fig. 22-b

PROCESS FOR PRODUCING AN ASSEMBLY OF MANY FIBERS

This application is a division of application Ser. No. 288,202, filed July 29, 1981 (now U.S. Pat. No. 4,414,276).

This invention relates to a novel assembly of composite fibers, novel fibers, and a novel process and apparatus for production thereof.

The novel fibrous assembly of the invention is an assembly of fibers composed of at least two dissimilar fiber-forming polymers, characterized by the fact that (1) it consists of numerous fibers, (2) at least 90% of said fibers have a non-circular cross-sectional shape, (3) the cross sections of at least 50% of said fibers differ from each other in at least one of shape and size, and (4) at least 50% of said fibers each have in their cross section taken at right angles to the fiber axis at least two side-by-side coalesced blocks of at least two different fiber-forming polymer phases with at least a part thereof being exposed to the peripheral surface of the fiber, at least one of the number, shape and size of the blocks varying from fiber to fiber.

It has now been found in accordance with this invention that the fiber assembly having the above characteristics can be produced by a novel spinning process and a novel spinning apparatus which are quite different from those in the prior art.

Numerous methods have heretofore been known for the production of fibrous materials from thermoplastic synthetic polymers. By the theory of production, they can be classified into those of the orifice molding type and those of the phase separation molding type.

The former type comprises extruding a polymer from uniform regularly-shaped orifices provided at certain intervals in a spinneret, and cooling the extrudate while drafting it. This method gives fibers having a uniform and fixed cross-sectional shape conforming to the geometric configuration of the orifices. According to this method, it would be extremely difficult in practice to produce composite fibers having a number of blocks (i.e., independent phases in a cross section of each fiber taken at right angles to the fiber axis and each consisting of different kinds of polymers) because the structure of the orifices should be made complex and the spinning operation becomes unstable. It would be impossible in practice to produce by this type of method composite fibers in which at least one of the number, shape and size of the blocks varies from fiber to fiber.

The latter-mentioned phase-separating molding type is a method described, for example, in U.S. Pat. Nos. 3,954,928 and 3,227,664 and Van A. Wente "Industrial and Engineering Chemistry", Vol. 48, No. 8, page 1342 (1956). This method comprises extruding a molten mass or solution of a polymer through a circular nozzle or slit-like nozzle while performing phase separation so that a fine polymer phase is formed, by utilizing the explosive power of an inert gas mixed and dispersed in the molten polymer, or applying a high-temperature high-velocity jet stream to a molten mass or a solvent flash solution of polymer, or by other phase-separating means. According to this method, large quantities of a nonwoven-like fibrous assembly which is of a network structure can be obtained. The fibers which form this fibrous assembly are characterized by the fact that the cross sections of the individual fibers are different from each other in shape and size. In other words, with this method, it is extremely difficult to obtain fibers having a controlled cross-sectional shape and size.

A method for producing a network nonwoven assembly of composite fibers composed of two different polymers by the phase-separation molding method is also known (European Patent Application No. 6704 laid open on Jan. 9, 1980). According to this method, the cross-sectional shape and size of fibers cannot virtually be controlled, and the use of an inert gas required in this method makes it very difficult to control the number, size and shape of polymer blocks in a fiber cross section.

These conventional techniques of producing a fibrous material give rise to problems to be solved. If these problems are overcome, new types of textile materials having better quality would be provided at lower costs.

A first problem in the orifice molding type method is that the geometrical configuration of the fibers becomes uniform and monotonous since it depends upon the shape of the orifices. In the case of composite fibers, too, the shape, size and number of blocks of dissimilar polymers are uniform along a fiber cross section. This is undesirable when the resulting product is intended for textile applications, for example as woven or knitted fabrics.

It is well known that the physical properties of a textile product depend not only on the properties of the substrate polymer of the fibers which constitute such a product, but also largely upon the geometrical configuration of the fibers, i.e. the shape and size of the cross-sections of the fibers. For example, the tactile hand of a product made of natural fibers depends largely on the cross-sectional shape of the fibers and the irregularity of their denier sizes. It is very difficult to obtain fibers having such irregularities from thermoplastic polymers by orifice molding.

Composite fibers have a uniform cross-sectional shape and size, but since a single fiber is formed of at least two dissimilar polymers, they exhibit different physical properties from ordinary fibers. However, because the number, shape and size of blocks composed of dissimilar polymers are uniform in all of the fibers, those physical properties which are attributed to the uniform cross-sectional shape and size are not improved greatly by co-spinning of the dissimilar polymers.

A second problem with the orifice-molding method is that if a number of orifices are provided in a single spinneret and the interorifice distance is decreased in order to provide large quantities of a high-density fibrous assembly, the barus effect and the melt fracture phenomenon of the molten polymer incident to orifice extrusion cause the filament-like polymer melts extruded from the orifices to adhere to each other, or to be broken. Accordingly, for industrial application, the interorifice distance can be decreased only to about 2 to 3 mm at the shortest. The number of fibers extruded from the unit area of each spinneret with such an interorifice distance is about 10 to about 20 at the largest, and it is impossible to produce a high-density fibrous assembly. In this technique, the molding speed is necessarily increased in order to increase productivity, and molding speeds on the order of 100 m/min. are usually employed.

In the latter-mentioned method of the phase-separation molding type, a fibrous assembly can be produced in a large quantity than in the first-mentioned method if the molding is effected by using slit-like nozzles. However, the product is merely a two-dimensional assembly. The fibrous assemblies obtained by this technique have irregularly-shaped fiber cross sections without exception, and variations in the cross-sectional shape and size and the denier of the fibers are so great that these factors are very difficult to control. Furthermore, it is even difficult to control the average denier of the fibers. Accordingly, the range of application of this technique is naturally limited. Moreover, fibrous assemblies obtained by the method of phase-separation type are distinctly network-like fibrous assemblies or assemblies of branched short fibers, and the fiber length between the bonded points of the network structure or the branches is, for example, several millimeters to several centimeter. Thus, the aforesaid method of phase-separation type cannot afford a fibrous assembly in which the distance between the bonded points of the individual fibers is, for example, at least 30 cm, preferably at least 50 cm, on an average and which therefore has the function of an assembly of numerous filaments.

It is an object and advantage of this invention to provide a new type of an assembly of composite fibers which cannot be obtained by conventional methods of making fibers from fiber-forming polymers.

Another object and advantage of this invention is to provide a new type of numerous composite fibers each having in its cross section taken at right angles to the fiber axis at least two side-by-side coalesced blocks of at least two fiber-forming polymer phases, at least one of the number, shape and size of the blocks varying from fiber to fiber.

Still another object and advantage of the invention is to provide a new type of an assembly of numerous composite fibers having a non-circular cross section, the cross sections of said fibers differing from each other in at least one of shape and size.

Still another object and advantage of the invention is to provide composite fibers constituting the aforesaid new type of fibrous assembly, in which the cross sectional area of each fiber and the sizes of at least two side-by-side coalesced blocks in each fiber vary within certain fixed ranges along the axis of the fiber.

Still another object and advantage of the invention is to provide an assembly of composite fibers of the type mentioned above which have many irregularly shaped crimps occurring with irregular periods along the axis of the fibers.

Still another object and advantage of this invention is to provide a novel assembly of composite fibers which is suitable as a material for spun yarns, knitted fabrics, woven fabrics, nonwoven fabrics and other textile products.

Still another object and advantage of this invention is to provide a novel process for producing an assembly of numerous composite fibers having at least two side-by-side coalesced blocks of at least two fiber-forming polymer phases in the cross-section of each fiber taken at right angles to the fiber axis, at least one of the number, shape and size of the blocks varying from fiber to fiber.

Still another object and advantage of this invention is to provide a process for producing the aforesaid assembly of numerous composite fibers in accordance with this invention by using a mesh spinneret having many small openings defined by partitioning members of small width having elevations and depressions on at least one surface thereof, said small openings being such that the molten mass of polymer extruded through a certain small opening of the spinneret can move toward and away from the molten mass extruded from another small opening adjacent to said opening or vice versa through the depressions of the partitioning members, the elevated and depressed surface of the spinneret being a polymer extruding side, which comprises feeding to said spinneret a molten macroblend having a number of continuous boundary lines between molten phases of dissimilar polymers, each of said boundary lines having a length longer than one-fourth of the average length of the partitioning members defining the small openings of the spinneret, cutting the molten macroblend with the partitioning members of the spinneret, and extruding the molten macroblend.

Still another object and advantage of the invention is to provide a novel laminated plate-type static mixer which is suitable for giving to a spinneret a molten macroblend having a number of continuous, relatively long extending boundary lines between molten phases of dissimilar polymers.

Still another object and advantage of the invention is to provide a spinning apparatus suitable for producing the assembly of composite fibers in accordance with this invention, which comprises a mesh spinneret and the static mixer stated above.

Further objects and advantages of the invention will become apparent from the following description.

The present invention is described below in more detail taken partly in conjunction with the accompanying drawings.

BRIEF DESCRIPTION OF THE ACCOMPANYING DRAWINGS

FIGS. 1-*a*, 1-*b*, 1-*c* and 1-*d* schematically show mesh spinnerets used in the process of this invention; 1-*a* showing a plain weave wire mesh, 1-*b* a twill weave wire mesh, 1-*c* a structure obtained by sintering two types of plain weave wire meshes in the bias direction, and 1-*d* an etched porous plate;

FIG. 2 in a generalized schematic view of a mesh spinneret in this invention in its arbitrary cross section in the fiber-forming region;

FIGS. 3-*a*, 3-*b* and 3-*c* are schematic views for illustrating the relation between the size of small openings in a spinneret and the state of formation of a molten macroblend phase;

Figure 7A:
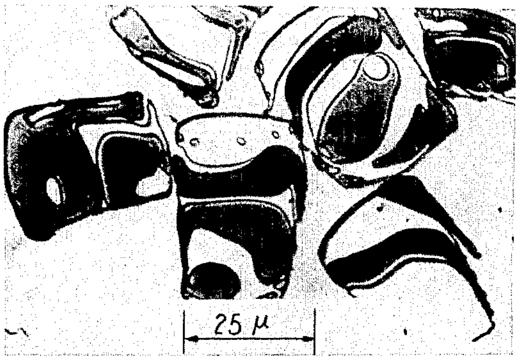
Figure 7B:
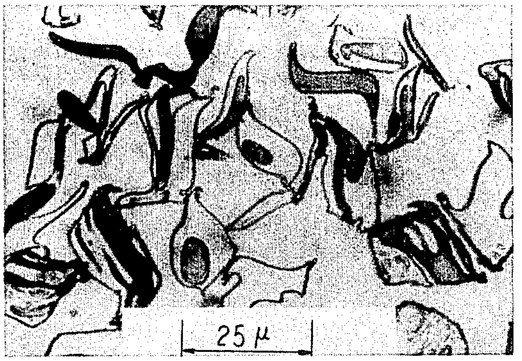
Figure 7C:
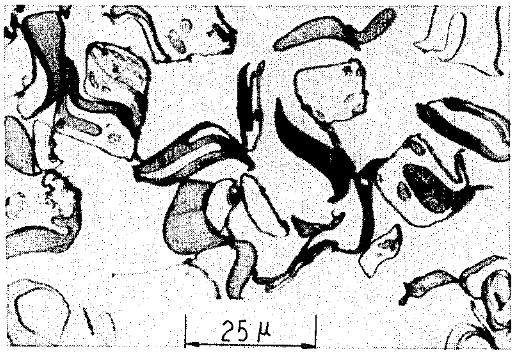
Figure 8:
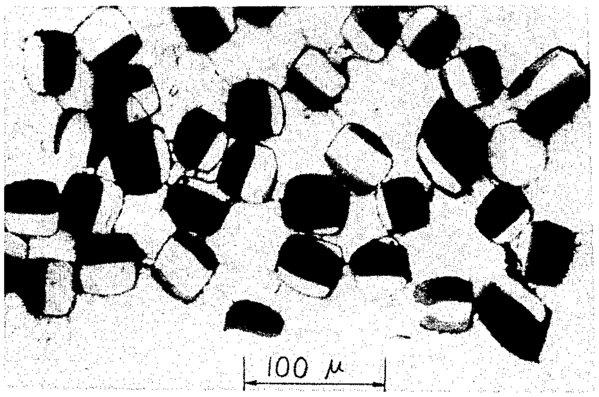
Figure 9:
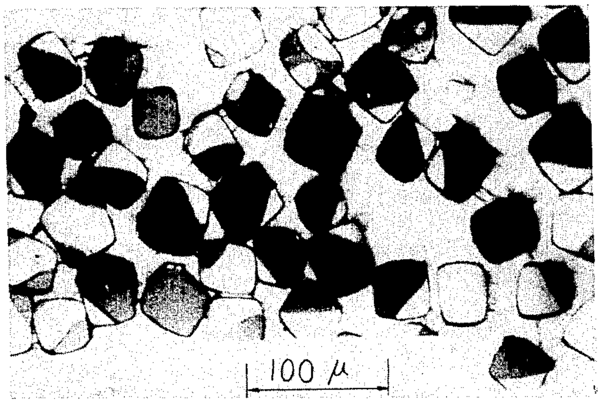
Figure 10:
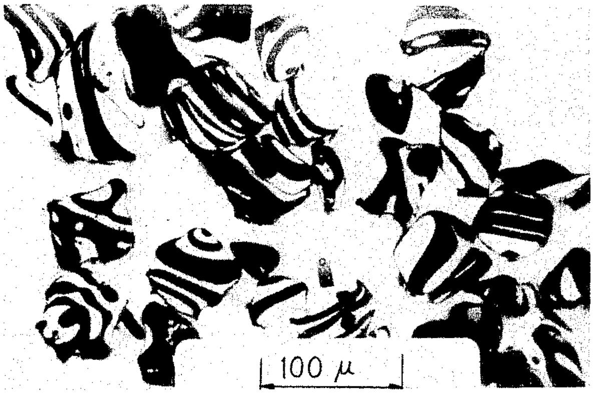
Figure 11:
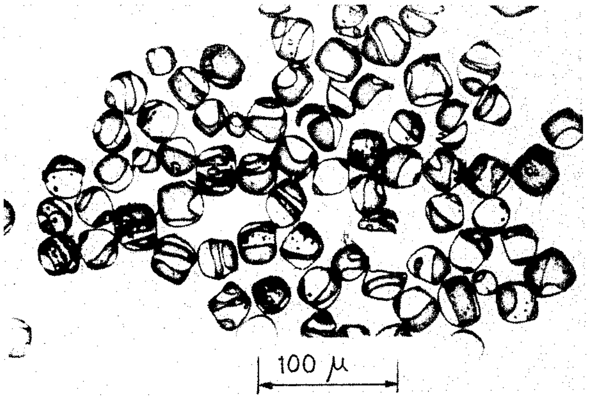
Figure 12:
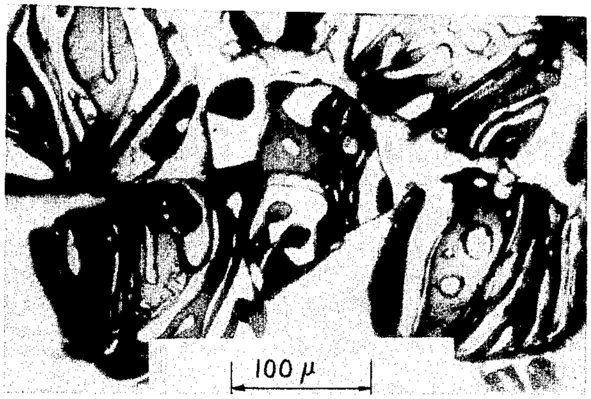
Figure 13:
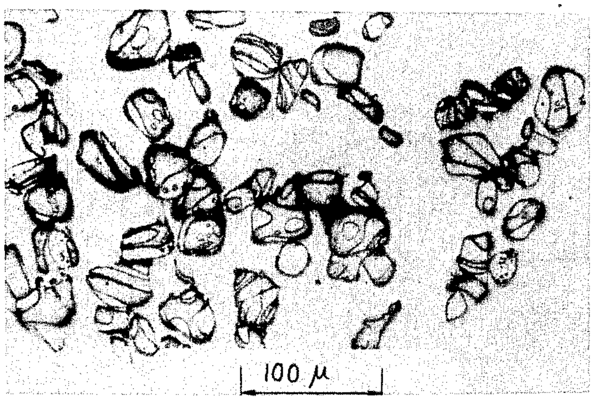
Figure 14:
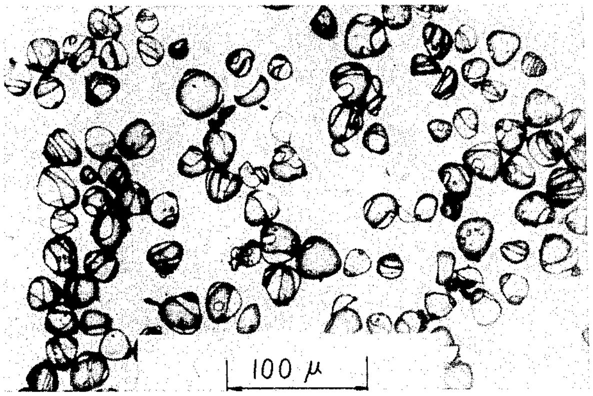
Figure 15:
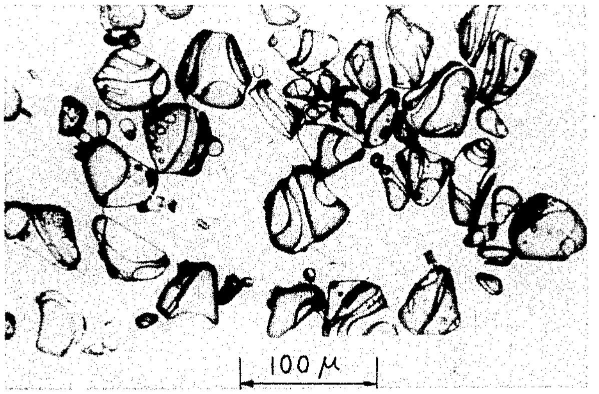
Figure 16:
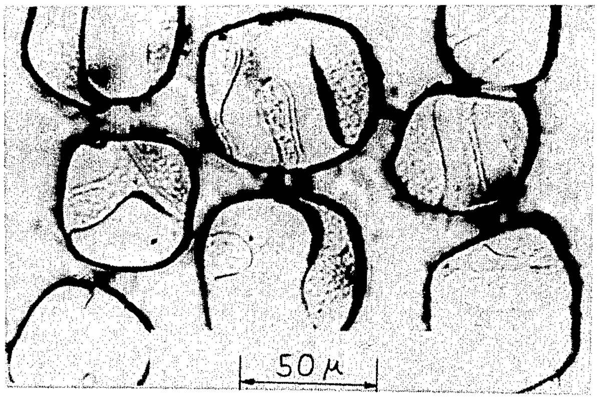
Figure 26:
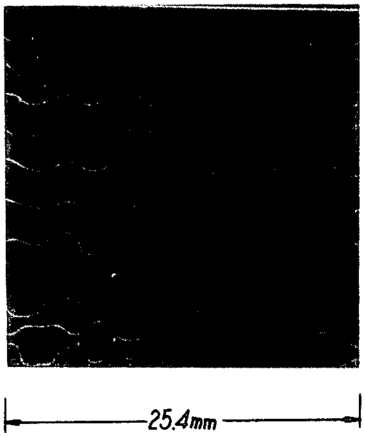
Figure 17:
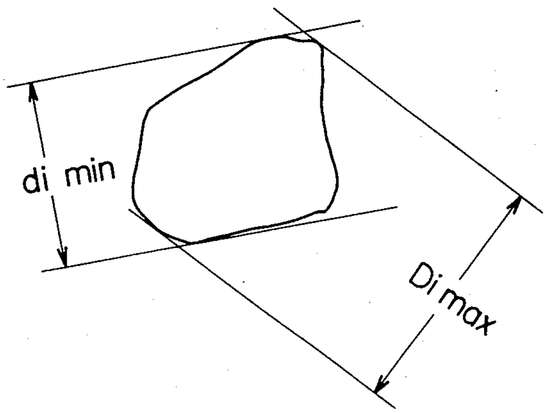
Figure 21:
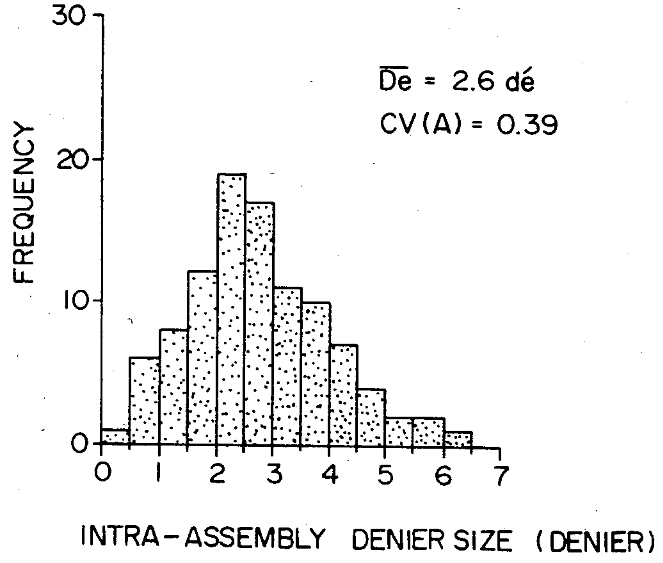
Figure 18:
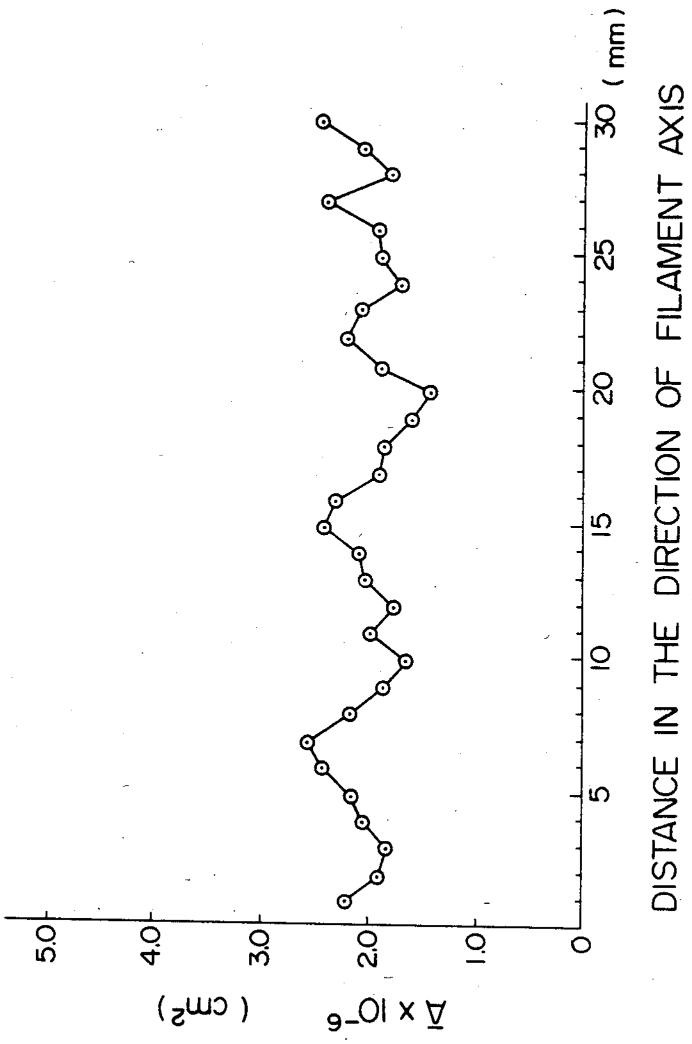
Figure 19:
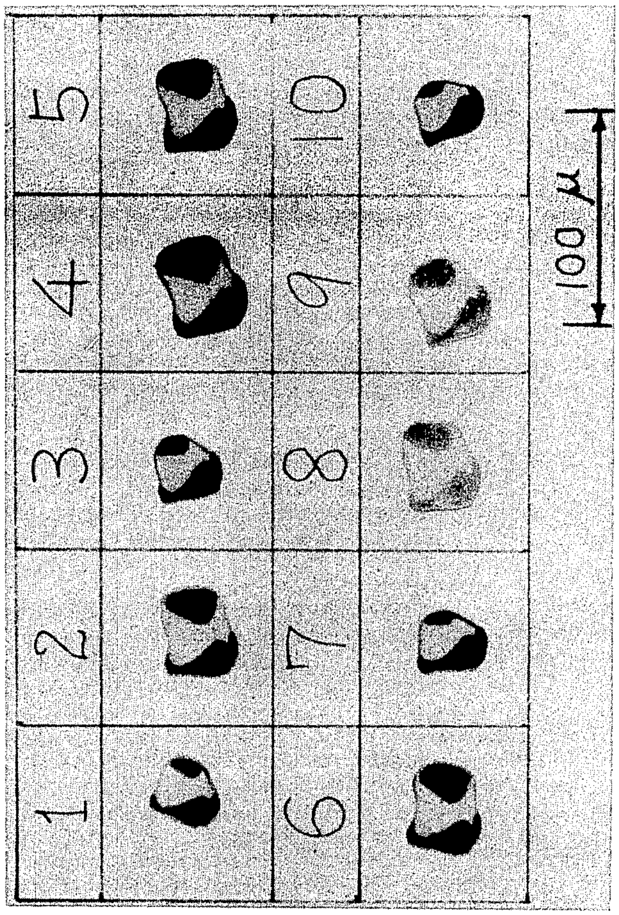
Figure 20:
Figure 23A:
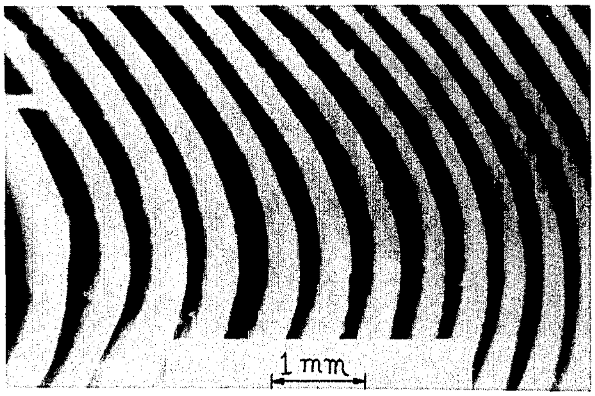
Figure 23B:
Figure 24:
Figure 25:

FIGS. 6-*a* and 6-*b* are enlarged schematic views showing embodiments of the laminated plate-type static mixer in accordance with this invention;

FIG. 7-*a* is a microphotograph of the cross section of the fiber assembly obtained in Example 2;

FIGS. 7-*b* and 7-*c* are each a microphotograph of the cross section of the fiber assembly after the fiber assembly has been cold-drawn and then heat-treated in boiling water;

FIG. 8 is a photograph of the cross section of the fiber assembly obtained in Example 18;

FIG. 9 is a photograph of the cross section of the fibrous assembly obtained in Example 19;

FIG. 10 is a photograph of the cross section of the fiber assembly obtained in Example 5;

FIG. 11 is a photograph of the cross section of the fiber assembly obtained in Example 6;

FIG. 12 is a photograph of the cross section of the fiber assembly obtained in Example 7;

FIG. 13 is a photograph of the cross section of the fiber assembly obtained in Example 8;

FIG. 14 is a photograph of the cross section of the fiber assembly obtained in Example 9;

FIG. 15 is a photograph of the cross section of the fiber assembly obtained in Example 10;

FIG. 16 is a photograph of the cross section of the fiber assembly obtained in Example 11;

FIG. 17 schematically shows the maximum distance ($Di_{max}$) of two parallel lines circumscribing a fiber cross section and the minimum distance ($di_{min}$) between them;

FIG. 18 shows variations in the cross sectional area of one fiber taken from the fiber assembly obtained in Example 16 in the longitudinal direction;

FIG. 19 is a photograph of the cross section of a fiber cross section of the assembly obtained in Example 6, which shows variations in the intra-fiber cross section;

FIG. 20 is a photograph showing the cross sections of the fiber obtained in Example 5 and the split product thereof;

FIG. 21 shows the denier size distribution of the fiber assembly obtained in Example 16;

FIG. 22-*a* and FIG. 22-*b* respectively show the distribution of the number of blocks in the fiber assemblies obtained in Examples 6 and 19;

FIGS. 23-*a* and 23-*b* are microphotographs of the laminar mixed melts and sampled in Examples 18 and 19;

FIG. 24 is a cross-sectional microphotograph showing the mixed state of the molten polymer phases obtained in Example 5;

FIG. 25 is a cross-sectional microphotograph showing the mixed state of the molten polymer phases obtained in Example 11; and FIG. 26 is a microphotograph showing the crimped state of the crimped fiber assembly ontained in Example 6.

MANUFACTURING APPARATUS AND PROCESS

The apparatus and process for producing the novel assembly of composite fibers in accordance with this invention will first be described.

The assembly of composite fibers in accordance with this invention can be typically manufactured by using a mesh spinneret which is characterized by having numerous small openings for extruding a melt of fiber-forming polymers on its extruding side such that discontinuous elevations (hills) are provided between adjacent small openings, and the melt extruded from one opening can move toward and away from the melt extruded from another opening adjacent thereto or vice versa through a small opening or depression (valley) existing between said elevations.

More specifically, the process of the invention is a process for producing an assembly of many fibers, which comprises extruding a molten macroblend composed of many molten phases of at least two dissimilar fiber-forming polymers through a mesh spinneret having many small openings defined by partitioning members of small width having elevations and despressions on at least one surface thereof, said small openings being such that the polymer melt extruded through one small opening of the spinneret can move toward and away from the polymer melt extruded from another small opening adjacent to said one opening or vice versa through depressions of the partitioning members, the elevated and depressed surface of the spinneret being a polymer extruding side; and taking up the extrudates from the small openings while cooling them by supplying a cooling fluid to the extrusion surface of said spinneret or to its neighborhood, whereby said extrudates are converted into numerous separated fine fibrous streams and solidified; characterized in that said macroblend is prepared by coalescing many distinct molten phases of at least two dissimilar polymers in such a manner that in a phantom cross section of the molten macroblend taken parallel to the spinneret, there exist many effective continuous boundary lines between the molten phases of dissimilar polymers each of which lines has a length larger than one-fourth of the length of a partitioning member which defines one small opening in the spinneret, whereby said many boundaries are cut with the partitioning members in the spinneret.

As stated above, the process of this invention is fundamentally different from those processes for producing composite fibers which involve extruding a plastic melt of at least two dissimilar polymers in a specified ratio from a conventional spinneret having a flat extrusion surface and regularly and independently aligned orifices or small openings.

The mesh spinneret used in the production of the assembly of composite fibers of the invention has a characteristic feature in its surface from which a polymer is extruded. The extrusion surface of the spinneret has many elevations and depressions and many extrusion openings. The extrusion surface is of such a structure that discontinuous elevations (hills) are provided between small adjacent openings on the polymer extruding side of the spinneret, and the polymer melt extruded from one small opening can move toward and away from the polymer melt extruded from another small opening adjacent thereto or vice versa through small openings or depressions (valleys) present between the elevations (hills).

A part of the mesh spinneret used in the process of this invention corresponds to one of the spinnerets disclosed in the copending U.S. patent application Ser. No. 133,288, filed Mar. 24, 1980 (now U.S. Pat. No. 4,355,075) filed by some of the inventors of the present application.

Examples of the mesh spinneret used in this invention include a plain weave mesh made of a metallic wire such as stainless steel or bronze; a specially woven wire mesh such as a twill weave wire mesh; a laminate of many plates having a saw-tooth like ends longitudinally aligned at fixed small distances; an etched porous plate obtained, for example, by providing on a stainless steel sheet elevations (hills) between small openings and depressions (valleys) between the elevations by means of elaborate etching technique; a sintered porous plate by sintering and bonding many minute metallic balls; and combinations of these structures.

Among these, the metallic wire meshes, etched porous plates and combinations of the same or dissimilar metallic wire meshes or etched porous plates are preferred.

These wire meshes and etched porous plates used as the mesh spinneret in this invention are illustrated in FIGS. 1-*a,* 1-*b,* 1-*c* and 1-*d.*

FIG. 2 is a generalized schematic enlarged view of an arbitrarily selected cut section of an area including the mesh spinneret, i.e. a fiber-forming area, in this invention. In FIG. 2, $A_i$ and $A_{i+1}$ represent the extrusion openings. The distance between the center lines of adjoining extrusion openings $A_i$ and $A_{i+1}$ is referred to as the distance $P_i$ between the extrusion openings. The average of $P_i$ values in all cut sections is defined as the average distance $\bar{p}$ between extrusion openings.

That portion of a cut section located on the right side of, and adjacent to, a given extrusion opening $A_i$ in a given cut section which lies on the extruding side of the surface of the fiber-forming area from the portion $A_i$ is termed a high $H_i$ annexed to $A_i$. The distance $h_i$ from the peak of hill $H_i$ to the levelled surface of $A_i$ is referred to as the hill height hi. The average of hi values in all cut sections is defined as the average hill height $\bar{h}$.

The width of the hill $H_i$ interposed between the extrusion openings $A_i$ and $A_{i+1}$ which is parallel to the levelled surface of the spinneret is referred to as hill width $d_i$. The average of $d_i$ values in all cut sections is defined as average hill width $\bar{d}$.

In accordance with the above definitions, the apparatus in accordance with this invention is advantageously such that the spinneret of its polymer molding area, i.e. fiber-forming area, has a surface with fine elevations and depressions and numerous polymer extrusion openings which meet the following requirements.

(1) The average distance ($\bar{p}$) between extrusion openings is in the range of 0.03 to 4 mm, preferably 0.03 to 1.5 mm, especially preferably 0.06 to 1.0 mm.

(2) The average hill height ($\bar{h}$) is in the range of 0.01 to 3.0 mm, preferably 0.02 to 1.0 mm.

(3) The average hill width ($\bar{d}$) is in the range of 0.02 to 1.5 mm, preferably 0.04 to 1.0 mm.

(4) The ratio of the average hill height ($\bar{h}$) to the average hill width ($\bar{d}$), $\bar{h}/\bar{d}$, is in the range of from 0.3 to 5.0, preferably from 0.4 to 3.0.

More advantageously, in addition to prescribing the values $\bar{p}$, $\bar{h}$, $\bar{d}$ and $\bar{h}/\bar{d}$ within the aforesaid ranges (1) to (4), the structure of the spinneret surface is prescribed so that the value $(\bar{p}-\bar{d})/\bar{p}$ is in the range of from about 0.1 to about 0.8, preferably from about 0.15 to about 0.7. The value $(\bar{p}-\bar{d})/\bar{p}$, represents the ratio of the areas of extrusion openings within the fiber-forming area (opening area ratio).

For the production of the assembly of composite fibers in accordance with this invention, it is essential to extrude a molten macroblend composed of many molten phases of at least two dissimilar fiber-forming polymers through the mesh spinneret described above (whose elevated and depressed surface is a polymer extruding side) in such a manner that in a phantom cross section of the molten macroblend taken parallel to the spinneret, there exist many effective continuous boundary lines between the molten phases of dissimilar polymers each of which lines has a length larger than one-fourth of the length of a partitioning member which defines one small opening in the spinneret, whereby said many boundary lines are cut with the partitioning members in the spinneret.

In order to extrude th molten macroblend from the spinneret while controlling it in the aforesaid manner, both the state of forming the molten phases of at least two dissimilar fiber-forming polymers in the molten macroblend and the size of the small openings of the spinneret must be taken into consideration.

Investigations of the present inventors have shown that the assembly of composite fibers in accordance with this invention can be produced by preparing a molten macroblend containing many effective boundary lines each of which has a length larger than one-fourth of the length of a partitioning member which defines one small opening in the spinneret used, and extruding the molten macroblend from the spinneret; or by using a spinneret in which the length of a partitioning members which defines one small opening of the spinneret is such that each of many effective boundary lines between the molten phases of the prepared macroblend molten is larger than one-fourth of said length of the partitioning member, and extruding the molten macroblend from the aforesaid spinneret.

The state of formation of the molten phases in the molten macroblend fed into the spinneret can be determined by removing the spinneret from the spinning apparatus, fitting into the position which was occupied by the spinneret now removed a cylindrical sampler which does not destroy the state of formation of the molten phases of the molten macroblend, sampling the molten macroblend into the sampler, then removing the cylindrical sampler from the spinning apparatus, quenching the molten macroblend in the sampler, cutting the solidified sample parallel to the spinneret, and observing the cut section of the sample.

FIGS. 3-*a*, 3-*b* and 3-*c*, respectively, are schematic views for illustrating the manner of the aforesaid control in the process of this invention having regard to the state of formation of the molten phases in the molten macroblend versus the size of the small openings of the spinneret.

The aforesaid control in this invention is described with reference to these drawings. In these drawings, an area defined by a large quadrilateral is a part of the molten macroblend. Straight lines running vertically in this area are boundary lines between adjacent molten phases of dissimilar polymers. The four differently-directed small squares represent the small openings of the spinneret.

It will be seen from the drawings that when a boundary line between molten phases is apparently larger than one-fourth (equal to the length of one side of a small square) of the length of a partitioning member which defines one small opening, a fine stream extruded through the small opening of the spinneret contains at least two distinct molten phases of at least two dissimilar polymers (when the fine stream is solidified and becomes a fiber, the individual molten phases form blocks in the fiber).

It should be understood that all of the line segments in the above drawings have meaningful lengths. It will be seen therefore that if, for example, one side of the large quadrilateral measures 10 mm and one side of the small square measures 2 mm, the above drawings teach the number of blocks contained in a composite fiber which is obtained by spinning a molten macroblend containing many molten phases extending long with a width of 1 mm through a small opening defined by a square partitioning member with each side measuring 2 mm.

When a molten macroblend containing many molten phases extending long with a small width as stated above is cut with small openings of the spinneret, the average number of blocks contained in the fine streams obtained through the small openings of the spinneret corresponds with the theoretical number of blocks $[\bar{N}_o(B)]$ shown below if the cutting is carried out ideally.

$$\overline{N}_o(B) = \frac{\overline{L}(w) \cdot \overline{N}(p) \cdot \overline{L}(p)}{100\pi} + 1$$

wherein $\overline{L}(w)$ is the average length (mm) of the partitioning members surrounding one small opening, $\overline{L}(p)$ is the length (mm) of a boundary line between molten polymer phases, and $\overline{N}(p)$ is the number of boundary lines between the molten polymer phases.

According to this equation, the theoretical number of blocks in the composite fiber obtained in the case of FIG. 3-*a* is calculated as 3.5, which is nearly equal to the average number (about 3.5) of blocks contained in the four differently-directed small squares.

As can be understood from the above description, in the production of the composite fibers by the process of the invention, the formation of the molten macroblend can be desirably controlled by the size of small opening in the spinneret, namely the length of a partitioning member which defines one small opening, and the state of formation of the molten polymer phases in the molten macroblend, namely the length and number of the boundary lines between the molten polymer phases.

It will also be seen from the above figures that side-by-side type composite fibers can be obtained when a molten macroblend containing many molten polymer phases extending long with a small width is partitioned with small openings.

FIG. 3-*b* is a schematic view showing an embodiment in which a polymer melt consisting of a molten phase (sea) of a polymer matrix and many molten phases (islands) of a different polymer dispersed in the sea is cut by small openings. In the figure, four squares of a a medium size represent the small openings, and many small squares represent the islands. The length of a boundary line between molten phases (the peripheral length of an island) is equal to one-fourth of the length of a small opening. The theoretical number of blocks ($\overline{N}_o(B)$), according to the above equation, is 4.6. It will be seen that from such a polymer melt containing many small islands dispersed therein, one of two blocks coaleasced side by side is too small and an assembly of sheath-core type composite fibers tends to form because small squares (blocks) included completely with the four squares of a medium size exist, and the area of the cut small squares (blocks) in the four squares of a medium size is small.

It will be seen from the above description that the desirable assembly of composite fibers in accordance with this invention which contain at least two blocks coalesced side by side can be produced by the process of the invention by using a molten macroblend and a spinneret in which many effective boundary lines continous boundary lines between different molten polymer phases exist each of which lines has a length larger than one-fourth of the length of a partitioning member which defines one small opening in the spinneret.

In the molten macroblend in which the molten polymer phases illustrated in FIGS. 3-*a* and 3-*b*, polymer phases adjoin each other orderly or relatively orderly as shown in FIGS. 3-*a* and 3-*b*. When a molten macroblend containing relatively randomly distributed molten polymer phases as shown in FIG. 3-*c* is to be cut with small openings of the spinneret, the theoretical number ($\overline{N}_o(B)$) of blocks contained in the resulting fine stream can be expressed by $$\overline{N}_o(B) = \frac{\overline{L}(w)}{2\overline{L}(c)} + 1$$

wherein $\overline{L}(w)$ and $\overline{L}(c)$ are as defined hereinbelow, by introducing the concept of the cord length ($\overline{L}(c)$) expressed by the following equation $$L(c) = \frac{100\pi}{2\overline{N}(p) \cdot \overline{L}(p)}$$

wherein $\overline{L}(c)$ represents the cord length (mm), $\overline{L}(p)$ is the average length (mm) of the continuous effective boundary lines between different polymer phases, and $\overline{N}(p)$ represents the number of such boundary lines.

It will be seen therefore that even when a polymer melt containing relatively randomly distributed molten polymer phases as shown in FIG. 3-*c* is used, the number of side-by-side coalesced blocks in a composite fiber obtained can be controlled by the cord length and the length of a partitoning member which defines a small opening, as parameters for the state of formation of the molten polymer phases in the polymer melt and the size of the small openings in the spinneret. Thus, according to the process of this invention, a desirable assembly of composite fibers having side-by-side coalesced blocks in accordance with this invention can also be produced from a polymer melt containing relatively randomly distributed molten polymer phases by controlling the cord length [$\overline{L}(c)$] and the length [$\overline{L}(w)$] of a partitioning member which defines one small opening of the spinneret, if there exist many effective boundary lines between the molten polymer phases each of which lines is larger than one-fourth of the length of a partitioning member which defines one small opening of the spinneret.

The cord length ($\overline{L}(c)$) is the average quotient obtained by dividing the length of a line segment AB ($\overline{AB}$) formed by the crossing of a given straight line G drawn through a unit region composed of a square each side of which is of a given length (e.g., 10 mm) with a boundary of the unit region, by the sum [n(p)] of the number of intersecting points formed within the unit region of the straight line G and boundary lines between the polymer phases which are longer than $\overline{L}(w)/4$ plus one (many straight lines G are drawn in the unit region, and the average [n(p)] of the quotients for these straight lines is determined). In practice, by setting a positional coordinate (x, y) and an angular coordinate ($\theta$) within a unit area by a table of random numbers in accordance with the Monte Carlo method and 100 straight lines G are drawn in the unit area. $\overline{AB}$/n(p) is calculated for the 100 straight lines and the average of the calculated values is determined.

The process of this invention can be advantageously practiced by preparing a molten macroblend in which at least one of the length and number of continuous effective boundary lines between different molten polymer phases is controlled and feeding the molten macroblend into the spinneret.

The process of the invention can be more advantageously practiced by preparing the molten macroblend such that there exist many continuous effective boundary lines between the different molten polymer phases each of which has a length larger than the length of a partitioning member which defines one small opening in the spinneret.

Preferably, the molten macroblend is such that in a phantom cross section taken parallel to the spinneret, at least one molten polymer phase forms a continous phase extending long with a small width, particularly a lameller structure.

The process of the invention can also be advantageously performed by controlling at least one of the average length ($\overline{L}(p)$) and number ($\overline{N}(p)$) of the effective continuous boundary lines between the dissimilar molten polymer phases and the average length ($\overline{L}(w)$) of a partitioning member which defines one small opening in the spinneret in such a manner as to give an assembly of many fibers which have blocks which are about one to about two times as many as the theoretical number of blocks [$\overline{N}_o(B)$] defined by the following equation $$\overline{N}_o(B) = \frac{\overline{L}(w) \cdot \overline{N}(p) \cdot \overline{L}(p)}{100\pi} + 1$$

and cutting many boundary lines between the dissimilar molten polymer phases with partitioning members defining the small openings in the spinneret. Such a process is applied to a molten macroblend in which the dissimilar molten polymer phases are of a relatively orderly shape, such as a shape extending long with a small width. When substantially one fiber is obtained from one small opening of the spinneret, for example as in the case of using a plain weave wire mesh as a spinneret, this process can give an assembly of composite fibers containing blocks the number of which approximately equals the theoretical number ($\overline{N}_o/(B)$) of blocks defined by the equation given hereinabove.

When one fiber is obtained from two small openings in the spinneret as in the case of using a twill weave wire mesh as the spinneret, this process can given an assembly of composite fibers containing about twice as many blocks as the theoretical number of blocks [$\overline{N}_o/(B)$] defined by the equation given hereinabove.

By using the laminated plate-type static mixer of the invention to be described in detail hereinbelow, a molten macroblend in which at least one molten polymer phase is of a relatively orderly shape as in the case of a continuous molten polymer phase which extends long with a small width can be fed into the spinneret while controlling the average length and number of the continuous effective boundary lines between the molten polymer phases. Accordingly, the desired blended condition can be created freely by using the laminated plate-type static mixer, and the number of blocks in the resulting assembly of composite fibers can be controlled easily to the desired value.

Moreover, the process of this invention can be advantageously practiced by controlling the cord length ($\overline{L}(c)$) represented by the following equation $$\overline{L}(c) = \frac{100\pi}{2\overline{N}(p) \cdot \overline{L}(p)}$$

defined by the average length [$\overline{L}(p)$] and number [$\overline{N}(p)$] of the continuous effective boundary lines between the different molten polymer phases, and the average length [$\overline{L}(w)$) of a partitioning member which defines one small opening in the spinneret in such a manner as to give an assembly of many fibers containing blocks the number of which is about one to about 2 times the theoretical number of blocks [$\overline{N}_o(B)$] defined by the following equation $$\overline{N}_o(B) = \frac{\overline{L}(w)}{2\overline{L}(c)} + 1$$

and cutting the many boundary lines between the dissimilar molten polymer phases with the partitioning members defining the small openings in the spinneret.

Such a process is applied to a molten macroblend in which the dissimilar molten polymer phases are relatively randomly distributed. In this embodiment, too, when a spinneret capable of forming one fiber from one small opening as in the case of a plain weave wire mesh and a spinneret capable of forming one fiber from two small openings as in the case of a twill weave wire mesh are used, there can be produced an assembly of composite fibers having blocks the number of which is nearly equal to $\overline{N}_o(B)$ and an assembly of composite fibers containing about twice as many blocks as $\overline{N}_o(B)$.

As stated above, a molten macroblend having ralatively randomly distributed molten phases of course, needs to have many continuous effective boundary lines between the dissimilar molten polymer phases each of which has a length larger than one-fourth of the length of a partitioning member which defines one small opening in the spinneret.

Such a molten macroblend can be advantageously prepared by using a Kenics-type static mixer to be described.

The molten macroblends to be fed into the spinnert in the process of this invention, whether the molten polymer phases therein are relatively orderly aligned or relatively randomly distributed, may permissibly contain continuous boundary lines between the dissimilar molten polymer phases which are shorter than one-fourth of the length of a partitioning member which defines one small opening in the spinneret used if only they have many continous effective lines which are longer than one-fourth of the length of a partitioning member which defines one small opening in the spinneret.

The molten phase having such a shorter boundary line is termed a microblend phase in this specification, and such a blended condition is expressed as a microblend.

Microblend phases may be positively included in the polymer melt used in the process of this invention. A microblend phase may frequently occur when the dissimilar polymers used have poor compatibility with each other.

In calculating the theoretical number of blocks [$\overline{N}_o(B)$] of a molten macroblend in the process of this invention, such a microblend phase is not taken into consideration. Accordingly, in the present invention, the term "effective boundary line" is intended to exclude a boundary line of a microblend phase. The term "continous" boundary, as used herein, means one continuous boundary line contained in a certain area or a part of one continuous boundary line which is cut in a certain area.

As will be seen from the above statement, the extrusion of the molten macroblend from the spinneret, when expressed very conceptually, can be said to be an operation of cutting the molten macroblend fed into the spinneret into many fine streams with the partitioning members defining the small openings in the spinneret so that the macroblended condition of the molten macroblend is substantially reflected.

Advantageously, the spinnerets suitable for performing such cutting have an opening area ratio, to be defined hereinbelow, which is the ratio of the total area of many small openings to the area of the entire extruding surface of the spinneret, of about 0.1 to about 0.8, preferably about 0.15 to about 0.7.

The opening area ratio is defined by the following equation.

$$\text{Opening area ratio} = \frac{\bar{p} - \bar{d}}{\bar{p}}$$

wherein $\bar{p}$ and $\bar{d}$ are as defined hereinabove.

The assembly of composite fibers of this invention can be produced as such by controlling the total length of the continuous boundary lines between dissimilar molten polymer phases and at least one of the size, shape and number of areas defined by the boundary lines in accordance with the above description and thereby allowing the partitioning members defining at least 50% of the entire small openings in the spinneret to cut the boundary lines between the dissimilar molten polymer phases.

Figure 4:
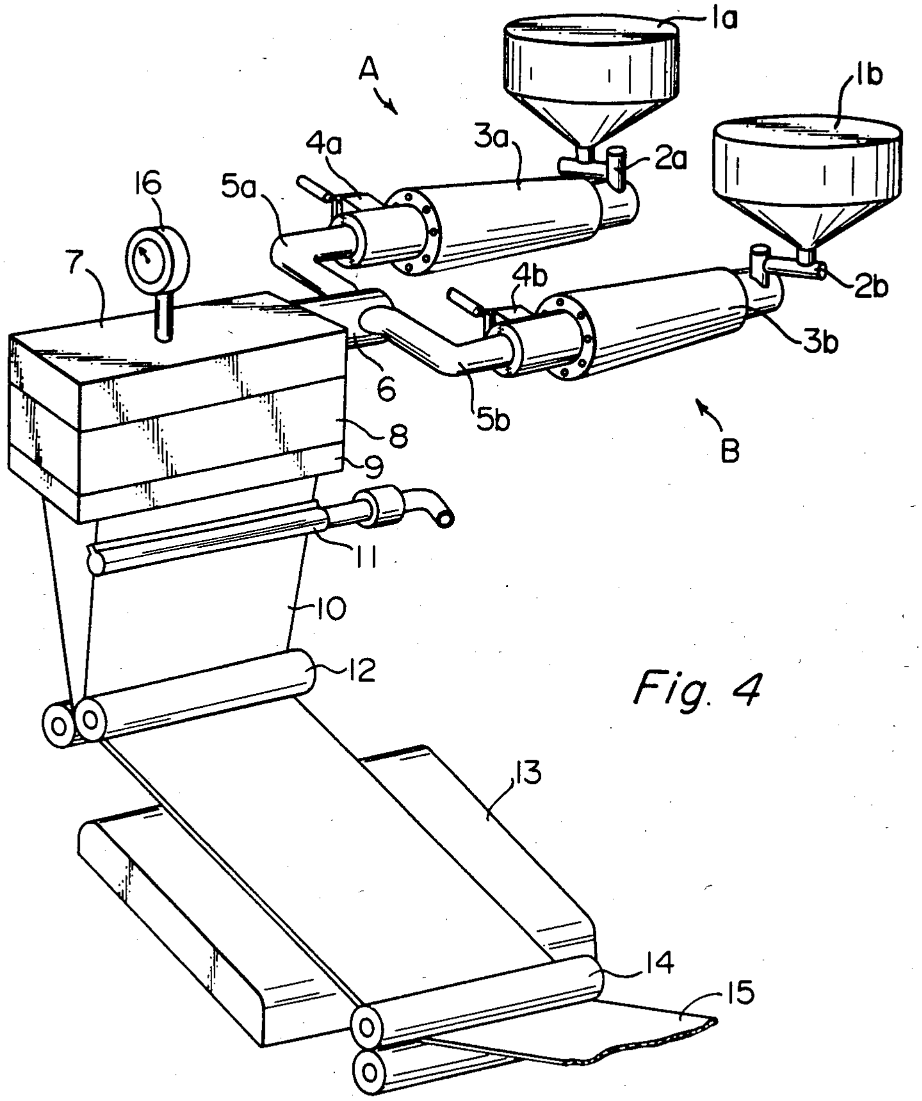
FIG. 4 is a rough sketch showing one embodiment of the apparatus for producing the fiber assembly of the invention.

In order to facilitate an understanding of the process of the invention described hereinabove, a series of steps which comprise forming a molten macroblend composed of many coaleased molten phases of at least two dissimilar polymers, feeding the molten macroblend into a mesh spinneret, and extruding the molten macroblend through many small openings in the spinneret to form an assembly of many fibers are described below with reference to FIG. 4 of the accompanying drawings which schematically show the outline of an apparatus for use in the above process. For simplicity, FIG. 4 omits those devices and parts which do not greatly affect the production of the fibrous assembly as above. The apparatus illustrated in FIG. 4 is applicable to the production of the assembly of composite fibers of the invention using two dissimilar polymers. From more than two dissimilar polymers, the fibrous assembly of the invention can equally be produced by only slightly modifying the apparatus shown in FIG. 4. This can be fully understood from the aforesaid detailed description of the molten macroblend and the small openings of the spinneret, and will require no detailed explanation.

On the side A in FIG. 4, a hopper 1*a*, a feeder 2*a*, a melt-extruder 3*a*, a gear pump 4*a* and a conduit 5*a* for one polymer are provided, and on the side B, there are provided a hopper 1*b*, a feeder 2*b*, a melt-extruder 3*b*, a gear pump 4*b* and a conduit 5*b* for the other polymer. The molten polymers melted and metered respectively on the sides A and B are associated at a mixer section 6, and conducted to an extrusion die 7. A mixer, especially a static mixer, is installed at an inside 8 of the extrusion die 7 or at the mixer section 6 to form a molten macroblend. The static mixer may be provided both at the inside 8 of the extrusion die 7 and the mixer section 6. The desired molten macroblend is formed by the static mixer. A pressure gauge 16 is located on the extrusion die 7.

As stated above, according to the process of the invention, the static mixer may be provided within or without the die, or both within and without the die, as stated above.

Figure 5:
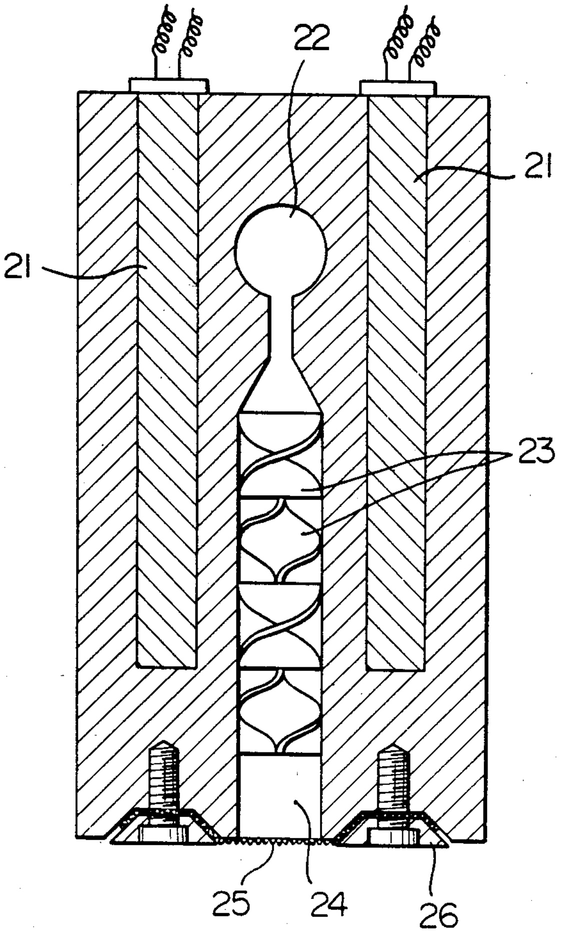
FIG. 5 is a schematic view showing the cross section of a die when a static mixer is installed inwardly of a spinneret in this invention.

An example of a spinneret in which a static mixer is provided within the die is shown in FIG. 5 which is a schematic longitudinal sectional view of such a spinneret. The reference numeral 21 represents an electric heater for maintaining the spinneret at the desired temperature, and the reference numeral 22, represents a passage of an I-die through which at least two dissimilar polymer melts pass. In the passage 22, no intensional mixing of the polymer melts is performed. The static mixer shown at 23 is provided upstream of a mesh spinneret 25. In the illustrated embodiment, the static mixer is of the Kenics type. Shown at 24 is a zone through which the molten macroblend from the static mixer flows to the mesh spinneret 25. The zone 24 serves as a reservoir for the polymer melts. The mesh spinneret 25 is firmly fixed by a fastener 26. The laminated plate-type static mixer to be described hereinbelow may be equally used instead of the Kenics type static mixer.

In providing the static mixer outside the die, it may be installed at the mixer section 6 shown in FIG. 4. Thus, when it is desired to have the static mixer both in and outside the die, it may be provided at the inside 8 of the die and at the mixer section 6.

The Kenics static mixer is preferred as the mixer to be provide outside the die.

The Kenics static mixer, as can be seen from FIG. 5, can be expressed as having a structure in which one or a plurality (for example up to 10) of dividing plates are provided for dividing the molten polymer phase in two or more sections.

Again, referring to FIG. 4, a mesh spinneret 9 is disposed beneath the extrusion die 7. From the spinneret 9, the polymer melt is extruded and solidified into fibrous fine streams, whereby an assembly of fibers is obtained. It is essential that by supplying a cooling fluid (e.g., air) to the polymer extruding surface of the mesh spinneret or to its neighborhood, the attenuated melt should be solidified while taking it up. For this purpose, a cooling fluid supplying device 11 is provided which has a nozzle or slit so that the cooling fluid can be supplied at a certain speed uniformly to the entire extruding surface of the mesh spinneret. Preferably, the cooling fluid is supplied to the extruding surface of the mesh spinneret or to its neighborhood so that the solidification length (P(S)) becomes not more than 2 cm. The solidification length (P(S)) denotes the distance over which a fine polymer stream leaving the surface of an elevation in the spinneret travels until it is solidified. The resulting assembly 10 of many composite fibers is taken up by a pair of take-up rollers 12. As can be understood from FIG. 4, the assembly of composite fibers can be taken up with substantially the same width as the width of the mesh spinneret. It can be fed to a subsequent step, for example a drawing step while its width is being kept the same. In FIG. 4, the drawing apparatus consists of a pair of nip rollers 12 which concurrently serve as take-up rollers and another pair of nip rollers 14 and a hot plate 13 interposed between these pairs of rollers.

The drawing device and method mentioned above are mere examples, and can be replaced by various other devices and methods to be described hereinabove. The drawin fibrous assembly 15 may be directly utilized, or can be sent to other processing steps, such as a splitting step, a crimping step, a cutting step (a step of forming short fibers), a fiber-spreading step, or a web-forming step. In FIG. 4, steps to be performed subsequent to the drawing step are not shown.

The fine streams from the spinneret can be taken up in accordance with the process of this invention so that the packing fraction (PF) defined by the following equation becomes $10^{-4}$ to $10^{-1}$ which is much higher than that (on the order of $10^{-5}$ at most) in a conventional melt-spinning process.

$$PF=1/Da$$

wherein Da is an apparent draft ratio.

The packing fraction (PF) represents the sum of the cross-sectional areas of the entire fibers of the fiber assembly formed per unit area of the fiber-forming area of the spinneret, and constitutes a measure of the density of fibers spun from the fiber-forming area, that is, the high-density spinning property.

The apparent draft ratio (Da) is defined by the following equation.

$$Da=V_L/V_o$$

wherein $V_L$ is the actual take-up speed of the fiber assembly (cm/min.), and $V_o$ is the average linear speed (cm/min.) of the polymer melt in the extruding direction when the polymer melt is extruded so as to cover the entire extrusion surface of the fiber-forming area of the spinneret.

Now, there will be described a mixer to be built in the extrusion die 8 (or the mixer section 6) for forming a molten macroblend suitable for the practice of the process of the invention by mixing at least two dissimilar molten polymer phases. For example, various static mixing units used normally in the mixing of molten polymers can be used either singly or in suitable combinations as the mixer for use in the present invention. Other examples of the mixer that can be used in this invention include a porous mixer obtained by closely aligning and laminating many porous corrugated plates in the longitudinal direction at certain intervals, a porous mixer made by closely aligning and laminating many wire meshes of a plain weave and/or twill weave in the longitudinal direction, and a thin porous mixer made by closely filling and aligning many minute metallic balls and sintering them and thus bonding them to each other. Commercially available static mixers include, for example, a static mixer of Kenics Corp., a Sulzer static mixing unit of Gebrûder Sulzer AG, Ross ISG mixer of Charles Ross Co., a square mixer of Sakura Seisakusho, a Komax mixer of Komax System, Co., and a Bayer continuous mixer of Bayer AG.

By using the aforesaid manufacturing apparatus, the fibrous assembly of the invention can be advantageously produced by mixing at least two dissimilar molten polymer phases by the static mixer and substantially maintaining the mixed state of the molten polymer phases which have left the static mixer until the mixture reaches the spinneret.

As stated hereinabove, the process of the invention is advantageously carried out by forming a mixed molten polymer phase of a relatively orderly shape in which at least one molten polymer phase extends long with a small width, partially that having a lamellar structure. For this purpose, the use of a laminated plate-type static mixer to be described in detail is recommended.

LAMINATE PLATE-TYPE STATIC MIXER

Investigations of the present inventors have shown that a molten macroblend in which at least one molten polymer phase in a cross section taken parallel to the spinneret extends long with a small width, in particular at least one said molten polymer phase is of a lamellar structure, permits easy control of the shape and size of the polymer phase in the fiber or the number of blocks therein, and can give the desired fibers advantageously.

According to this invention, the molten macroblend in which at least one molten polymer phase extends long with a small width, particularly has a lamellar structure, can be formed by using a static mixer having the following constituent elements (a) to (e).

The static mixer in accordance with this invention is characterized by the fact that (a) it is a laminate made of a plurality of plates having a depressed portion, (b) the depressed portion of each of said plates forms a fluid inlet and a fluid outlet communicating with the fluid inlet, (c) said plates are comprised of at least two types of plates having differently-shaped depressed portions, (d) the fluid inlets of plates having depressed portions of the same shape form a common inlet for the same fluid, and thus the laminate has at least two common inlets for at least two different fluids, and (e) the fluid outlets are formed so as to give at least two different fluid flows adjoining each other.

In the present specification, the mixer having the above constituent elements (a) to (e) is referred to as a "laminated plate-type static mixer". As far as the present inventors know, such a laminate plate-type static mixer is a new type of mixer not known heretofore. By using this type of mixer, there can be easily obtained a molten macroblend in which a number of molten phases of at least two dissimilar polymers are coalesced in a lamellar structure, i.e. in a thin laminar flow. According to the laminated plate-type static mixer, a very thin layer-like melt can be obtained. It also achieves various excellent industrial advantages in that the combination of polymer phases can be changed optionally, the thickness of each polymer phase can be controlled easily, a uniform and specified layer-like polymer melt can be easily obtained, and the mixer is simple in structure and can be easily built. In addition to using the mixer in combination with the spinneret for the production of the fibrous assembly of the invention, it can also be used in other applications.

In the laminated plate-type static mixer in accordance with the invention, at least two fluids from which to form a mixed laminar flow do not contact each other within the mixer but make substantial contact with each other for the first time in the fluid discharging zone of the mixer. This is believed to be the reason why the static mixer of the invention can be advantageously applied to the mixing of at least two fluids to give a molten macroblend the formation of which is difficult with conventional mixers because of the differences in physical properties such as the surface tension, interfacial tension, viscosity and solubility parameter of the fluids or the influences of chemical properties such as reactivity.

The laminated plate-type static mixer in accordance with this invention will be illustrated in more detail with reference to FIGS. 6-*a* and 6-*b* without any intention of limiting the invention thereto.

FIGS. 6-*a* and 6-*b* are enlarged schematic views of embodiments of the laminated-plate type static mixer in accordance with this invention.

Generally, the plates having a depressed portion which constitute the static mixer of the invention are preferably flat plates. They may, however, be of other shapes, such as wavy shape as shown in FIG. 6-*a*. The plates should at least be such that when they are used as a laminated assembly, fluids do not overflow or leak into areas other than the depressed portions, and the fluid flows which have left the depressed portions are laminated in a multiplicity of layers.

FIG. 6-*a* specifically shows a mixer consisting of two different types of plates P-a and P-b having depressed portions of different shapes which are alternately laminated. For easy explanation, one plate P-a is shown away from the assembly on the left side of the drawing.

The depressed portions provided in the plates act as a passage or channel for passage of fluids, and shown hatched in the drawing in plates P-a and P-b. The depressed portions, in a laminated assembly of the plates, form inlets for introduction of fluids ($a_1$, $a_2$ and $a_3$ in P-a and $b_1$, $b_2$, $b_3$ and $b_4$ in P-b) and outlets for discharging the fluids (shown at $X_a$ in P-a and $X_b$ in P-b), and in one plate the fluid inlets and outlets communicate with each other. The depth ($t_2$) of the depressed portion is smaller than the thickness ($t_1$) of the plate, and is preferably satisfies the following expression.

$$0.2t_1 \leqq t_2 \leqq 0.8t_1$$

wherein $t_1$ is the thickness (mm) of the plate, and $t_2$ is the depth (mm) of the depressed portion.

The especially preferred depth of the depression satisfies the following expression.

$$0.3t_1 \leqq t_2 \leqq 0.7t_1$$

wherein $t_1$ and $t_2$ are as defined hereinabove.

It is not necessary that all of the plates have the same thickness. Generally, however, plates of the same type desirably have the same thickness in order to obtain a homogeneous molten macroblend. It is especially advantageous to laminate at least two types of plates having the same thickness and the same depth in building the static mixer of the invention.

The thickness ($t_1$) of the plate is generally in the range of 0.05 to 2 mm, preferably 0.1 to 1 mm, especially preferably 0.2 to 0.7 mm.

In FIG. 6-*a*, a set of plates P-a are laminated alternately with a set of plates P-b so that excepting the plates at the ends any one plate P-a or P-b is interposed between two plates P-b or P-a respectively. The depressed portion of the plate P-a is shown by righthandedly upwardly extending hatches, and the depressed portion of the plate P-b, by righthandedly downwardly extending hatches, and these depressions differ from each other in shape. The shapes of these depressed portions can be freely designed so long as they meet the requirements described hereinabove.

The shape of the depressed portion can be optionally determined by considering the size, shape, number of position of fluid inlets and the size, shape and position of fluid outlet. An island-like elevation, such as shown at Ia in plate P-a and Ib in plate P-b may be provided in the depressed portion. At least one such island-like elevations may exist in the depressed portion. The provision of such island-like elevations improves the shape retention of a mixer constructed by laminating the plates, and also makes it easy to control the pressure and flow rate of a fluid flowing through the depressed portion. The island-like elevation mah be located on the fluid outlet $X_a$ as is the case with Ia in FIG. 6-*a*, or may be located in an inward portion of the derpessed portion as in the case with Ib in the plate P-b.

As stated hereinabove, the laminated plate-type static mixer is characterized in that the fluid inlets of plates having depressed portions of the same shape form a common inlet for the same fluid and thus the laminated structure has at least two common inlets for at least two different fluids, and that the fluid outlet is formed so as to give at least two fluid flows adjoining each other.

Referring to FIG. 6-*a*, two different types of plates P-a and P-b in large number are laminated alternately so that two fluid outlets $X_a$ and $X_b$ are formed on the same plane so as to give two different fluid flows aligned side by side. The plates P-a and the plates P-b face in the same direction along the laminating direction, and the fluid inlets $a_1$, $a_2$ and $a_3$ of the plates P-a each occupy the same position in a band form, and likewise, the fluid inlets $b_1$, $b_2$, $b_3$ and $b_4$ of the plates P-b each occupy the same position in a band form. For example, the fluid inlets $a_2$ of the plates P-a form a common band-like fluid inlet $A_2$, and the fluid inlets $a_3$ of the plates P-a form a common band-like fluid inlet $A_3$. Although not shown in the drawing, it will be readily understood that the fluid inlets $a_1$ of the plates P-a also form a common band-like fluid inlet.

On the other hand, in the plates P-b, the fluid inlets $b_1$, $b_2$, $b_3$ and $b_4$ respectively form common band-like fluid inlets (for example, $B_2$, $B_3$ and $B_4$ corresponding to $b_2$, $b_3$ and $b_4$ in FIG. 6-*a*).

The plates P-a and P-b respectively have three and four fluid inlets. The number of fluid inlets in each plate may be from 1 to 4. For the purpose of the present invention, the same polymer melt should desirably be introduced from a plurality of fluid inlets provided in the same type of plates. For other purposes, this is always necessary, and different fluids may be introduced from such inlets.

The number and positions of fluid inlets in each plate are determined in consideration of the type, amount, etc. of fluids to be introduced into the individual plates in order that a fluid flowing from the fluid outlet $X_a$ of the plate P-a and a fluid flowing from the fluid outlet $X_b$ of the plates P-b may contact each other on the same plane as layers and form a molten macroblend having a uniform lamellar structure.

In the laminated plate-type static mixer in accordance with this invention, the individual common fluid inlets may be located on the same or different planes of the laminated assembly. For example, in FIG. 6-*a*, the common fluid inlets $B_2$, $A_2$ and $B_3$ are on the same plane, and the commone fluid inlets $A_3$ and $B_4$, on a different plane. Although not shown in the drawing, a common fluid inlet based on the inlets $a_1$ and a common inlet based on the fluid inlets $b_1$ are located on still another plane of the laminated assembly.

The plate P-a has a fluid outlet $X_a$, and the plate P-b, a fluid inlet outlet $X_b$. The two types of fluid outlets $X_a$ and $X_b$ are located on the same plane of the laminated assembly and form one fluid discharge zone. At least two fluids make substantial contact with each other for the first time in this fluid discharge zone after they have passed through the depressed portions of the individual plates, whereby they form one fluid having a lamellar structure. In the fluid discharging zone, the fluid outlets of plates having depressed portions of the same shape may be located substantially on the same plane. Preferably, all of the fluid outlets of the different plates having differently-shaped depressed portions are located on the same plane.

The plate having a depressed portion has a width (W) of generally 5 mm to 10 cm, preferably 1 cm to 50 cm, and a height (H) of 5 mm to 50 cm, preferably 1 cm to 30 cm.

One or a plurality of small holes extending through the plate may be formed in the depressed or other portions of the plate. In FIG. 6-*a,* a small hole $H_a$ is formed in the non-depressed portion of the plate P-a, and a small hole $H_b$ is formed in the depressed portion of the plate P-b. These small holes $H_a$ and $H_b$ are formed for pressure adjustment or movement of a small proportion of fluid between two plates having the same depressed shape (for example, between two plates P-a or between two plates P-b) or between two plates having different depressed shapes (for example, between the plate P-a and the plate P-b), and the diameter, number and positions of the small holes are determined as required according to the purpose of providing such small holes.

The fluid outlets (for example, $X_a$ and $X_b$) of the plates preferably have the shape of a straight line. This is, however, not restrictive, and the fluid outlet may be of a stepped shape or saw-tooth like shape. It is essential that the same type of fluid outlets of the same type should be located on the same plane, and preferably form a flat surface as a whole on the same plane, in order to give side-by-side aligned fluid flows of different fluids.

FIG. 6-*b* shows a laminated plate type static mixer consisting of at least two types of plates having different raised and depressed shapes which are laminated alternately. This static mixer is suitable for obtaining a mixed fluid having a lamellar structure in which two types of fluids are associated in layers uniformly and regularly.

In the laminate shown in FIG. 6-*b,* it is not always necessary to laminate plates having two differently-shaped depressions in an alternate manner as in FIG. 6-*a.* In FIG. 6-*b,* the two types of plates may be laminated in suitable combinations, for example as in (P-a+P-a+P-a+P-b), (P-a+P-a+P-b), or (P-a+P-b+P-b). Or at least three types of plates having different depressed portions may be laminated alternately or in suitable combinations.

It is preferred that the static mixer of the invention, consist only of many plates having at least two different depressed shapes. If desired, smooth plates or porous plates having no depressed portion (e.g., plates of sintered metal, fibrous webs, woven fabrics, wire meshes, etc.) may partly be incorporated in the laminated assembly.

FIG. 6-*b* shows is an enlarged schematic perspective view of another typical embodiment of the laminated plate-type static mixer which is viewed from the fluid discharge side.

The mixer shown in FIG. 6-*b* consists of different types of plates P-c and P-d having depressed portions of different shapes which are laminated alternately in a regular fashion. Each of the plates P-c and P-d has one fluid inlet. The fluid inlets of the plates P-c form a common band-like fluid inlet $A_1$, and the fluid inlets of the plates P-d form one common band-like fluid inlet $B_1$.

Many elevations Ic and Id are provided on the depressed portions of the plates P-c and P-d. In FIG. 6-*b,* the plate P-d laminated inwardly of the plate P-c in its perspective view is shown apart from the laminated assembly for easy understanding.

Fluids introduced from the common fluid inlets $A_1$ and $B_1$ respectively pass through the depressed portions of the plates P-c and P-d and are discharged from fluid outlets $X_c$ and $X_d$, respectively.

From the fluid outlets $X_c$ and $X_d$ two different fluids come out in thin layers aligned side by side. These different fluid flows contact and are associated to form a mixed fluid having a lamellar structure. Accordingly, the thickness of the layer of the lamellar structure has closely to do with the thickness of the plate, especially the depth of the depressed portion of the plate.

As stated hereinabove, in one preferred embodiment of the process of this invention using the laminated plate-type static mixer, a molten macroblend consisting of molten phases of at least two different fiber-forming polymers in which in its cross section taken parallel to the spinneret, at least one molten polymer phase is a continuous phase extending long with a small width, particularly the one having a lamellar structure, is fed into the mesh spinneret so as not to substantially disturb the continuous molten phase, and is converted into fine fibrous streams.

In order to introduce the molten macroblend consisting of molten phases of at least two dissimilar fiber-forming polymers prepared by the aforesaid laminated plate type static mixer into the mesh spinneret in a stable condition without disturbing the boundaries between the different polymer melt phases in the macroblend, it is desirable that the distance between the fluid flow inlet of the static mixer and the mesh spinneret should not be too long, and an obstacle to the flow of the molten phases should not be present between them to the greatest possible extent. It is more preferred that the area of the molten polymer flowing from the static mixer should be substantially be greatly different from that of the mesh spinneret, and that there should not be a great difference between the shapes of the two.

In some cases, however, an additional static mixer may be provided between the aforesaid laminated plate type static mixer and the mesh spinneret if it does not greatly disturb a boundary line between at least two dissimilar molten polymer phases.

METHOD FOR DRAWING A FIBER ASSEMBLY

The assembly of many fibers prepared by the process of this invention described hereinabove may be used in the as-spun state or may be drawn before use. The drawing operation decreases the average denier size of the fibers and improves the physical properties of the fibers, particularly their strength and degree of orientation, over the as-spun fibrous assembly, but in many cases does not substantially change the state of blocks in at least two different polymer phases in a cross section of the fibers. The drawn fiber assembly thus retains the characteristics of the fiber assembly described hereinabove. The method for drawing the fiber assembly will be described in detail below.

Drawing of the fibrous assembly produced by the process of this invention can be effected generally in the same way as in the case of drawing fibers composed of thermoplastic synthetic polymer.

According to the process of this invention, the fibrous assembly is obtained in the form of a thin sheet in a direction at right angles to the fiber axis. Hence, the sheet-like assembly (consisting of substantially parallel-laid fibers) can be drawn without changing its width, and this is advantageous.

In order to facilitate an understanding of the drawing operation in this invention, it is described below with reference to one specific embodiment.

The undrawn fibrous assembly produced by the spinning process of this invention is conducted to a frictional guide, such as at least one tubular friction body (e.g., the member 12 shown in FIG. 4), and is drawn by maintaining the feeding speed ($V_1$) of the undrawn fibrous assembly at the tubular friction body lower than the takeup speed ($V_2$) of the fibrous assembly after drawing ($V_1 < V_2$) in such a manner that no tension extends to the spinneret. By this operation, the fibrous assembly can be continuously drawn stably while keeping its width corresponding substantially to the width of the spinneret.

By providing a heating zone (for example, the hot plate 13 shown in FIG. 4) between the friction body and means for taking up the drawn fibrous assembly, the fibrous assembly can be hot-drawn immediately after the spinning. As a result, the drawn fibrous assembly can be easily produced.

The mounting position or angle of the frictional guide may be optional if it can be restrict the speed ($V_1$) of the undrawn fibrous assembly. The frictional guide may be at least one of plates, tubes, square objects, tooth-like structures, or rollers, or a combination of two or more of these different types of frictional guides may be used. At least one pair of rollers of the substantially nipping type may also be used. By moderately heating the frictional guide, the speed of introducing the undrawn fibrous assembly can be easily restricted, and tension equilibrium in the fibrous assembly can be easily achieved. The surface of the frictrional guide may be finished, for example, by mirror-finishing plating, or in a crepe weave or a special raised and depressed pattern, or by resin coating. But any frictional guide which can restrict the speed ($V_1$) of the undrawn fibrous assembly can be used in this invention irrespective of its material and shape.

The degree ($V_2/V_1$) of drawing the fibrous assembly can be varied by suitably changing the types of the fiber-forming polymers which constitute the fibrous assembly, the shape of the guide frictional guide, the form and material of its surface, and the combination and temperature of heaters in the heating zone. Generally, the drawing is desirably carried out at a draw ratio of 1.1 to 10, preferably 1.5 to 5.

The fibers constituting the fibrous assembly of the invention have an irregular periodic variation in cross-sectional area along its longitudinal length in their cross section, at least two dissimilar polymer phases are coalesced side by side. When the fibrous assembly is drawn while the draw ratio is increased, it never happens that the assembly as a whole is broken at a time at a certain fixed position. But as the draw ratio increases, the fibers may partly be broken gradually or partly split. This is also within the scope of the invention so long as the assembly to be drawn is not wholly broken. In other words, the drawing of the fibrous assembly of the invention is advantageous and characteristic in that even such partial breaking or partial splitting occurs, the entire fibrous assembly can be drawn without any trouble.

In performing the drawing, the temperature of the fibrous assembly of the invention may be from room temperature to a temperature below the point at which the polymers constituting the fibers melt. The preferred drawing temperature depends upon the types, combination and proportions of at least two dissimilar polymer phases which constitute the fibers, and the shape and number of blocks in the polymer phases. Generally, the preferred drawing temperature is from room temperature to a point lower than 0.9 times the apparent melting point in absolute temperature (°K.) of a polymer phase having the lowest apparent melting point among the dissimilar polymer phases. Since the drawing temperature is also greatly affected by the means, speed and ratio of drawing, it can be optimized by repeating simple experiments.

As stated hereinabove, the undrawn fibrous assembly of the invention is characterized by the fact that the cross-sectional area of each fiber varies irregularly along its longitudinal direction, the cross-sections of the constitutent fibers differ from each other in at least one of shape and size, and the size of the blocks in a fiber cross section varies along its longitudinal direction. Accordingly, the fibrous assembly of the invention is free from a variation in the stability of the drawn condition due to slight differences in temperature, which variation is seen in the drawing of a conventional assembly of uniform fibers. Thus, according to the process of this invention, the drawing can be easily effected within a broader temperature range than those conventionally employed, and an assembly having partly broken fibers or an assembly having partly split fibers can be obtained. By utilizing this phenomenon, a fibrous assembly similar to a sliver in frame spinning, and a bulky yarn-like assembly having similar properties to spun yarns can be produced directly with ease.

In the heating zone in the drawing operation, at least one heater is provided preferably in a path of the fibrous assembly. Desirably, the gradient of the heating temperature in a single heater can be controlled suitably. Not only one-stage drawing but also multi-stage drawing can be easily effected by dividing the heating zone into a plurality of sections, providing a plurality of heaters in the thus divided heating zone, and prescribing a suitable temperature in every one of the heaters.

The heater to be used in the heating zone may be a contact-type heater having a heating function, such as a flat plate, a curved plate, a plate processed in a raised and depressed pattern, or a pin, or a noncontact-type heater such as radiation heat, an electric heater, hot steam, or hot air. When the contact-type heater is used, the drawing operation tends to be affected by the surface roughness of the heater. Thus, by finishing the surface of the heater by mirror-finish plating or surface roughening treatment for imparting a crepe weave pattern for example, or coating the surface with a resin such as a fluorocarbon resin, it is possible to prevent the blocking phenomenon of the fibrous assembly and subtly change the draw ratio. The length of the heater on the path of the fibrous assembly may be opltional. Preferably, the heater has such a structure as can supply heat uniformly to the fibrous assembly in its widthwise direction.

The drawing of the fibrous assembly may be facilitated by applying a surface-treating agent such as an oiling agent to the fibrous assembly by coating or impregnation.

By utilizing the characteristics of the fibrous assembly in accordance with this invention, unique crimped yarns may be obtained. The fibrous assembly of the invention can be converted to crimped yarns by a simple method which does not require a complex operation such as mechanical crimping frequently practiced in the crimping of fibers. Specifically, crimping can be easily imparted to the fibrous assembly of the invention by heat-treating it under tension or under no tension in dry heat, boiling water, etc., or in some case, by simply drawing it.

The crimped yarns so obtained are characteristic in the shape and structure of the crimps because in the fibrous assembly of the invention, at least 90% of the constituent fibers have a non-circular cross section, the cross sections of many of the fibers differ from each other in at least one of shape and size, and at least 50% of the fibers of the assembly have at least two side-by-side coalesced blocks of at least two dissimilar polymer phases, at least one of the number, shape and size of the blocks varying from fiber to fiber. Specifically, on the basis of the shape of the blocks, the crimping treatment gives more complex crimps than in the case of crimped yarns from composite fibers having uniform block shapes obtained by conventional melting methods. The resulting crimps are fine and occur irregularly and three-dimensionally. In particular, since each of the fibers constituting the fibrous assembly of the invention has a cross section varying in size irregularly and periodically along its longitudinal length, the combination of this feature with the aforesaid characteristics of the shape of the blocks makes it possible to give crimped yarns having very fine irregular and three-dimensional crimps. Accordingly, there can be obtained a fibrous assembly which have crimps, is bulky and has excellent elastic recovery. The average number of crimps is preferably 3 to 20 per inch, especially preferably 5 to 15 per inch. The crimp ratio is preferably 10 to 50%, more preferably 15 to 45%. A highly crimped fibrous assembly having these properties can be obtained according to the invention.

The crimped fibrous assembly can be directly used as a cushioning material and a heat insulating material. It may also be converted to a web and used as a material for nonwoven fabrics.

Sometimes, the fibrous assembly of the invention can be changed to an assembly consisting of partly split fibers by drawing. The assembly of partly split fibers provided by this invention can also be produced by appying a physical external force such as crumpling or napping, or such a means as heat-tretment or swelling treatment, or a combination of these.

The assembly of composite fibers in accordance with this invention which can be split depends basically upon the types of the dissimilar polymers to be coalesced and the shape of the blocks. Partial splitting occurs relatively easily with a combination of polymers having poor adhesiveness, for example a combination of polyethylene terephthalate and polypropylene, or with an assembly in which the boundary lines between blocks extend relatively long.

ASSEMBLY OF COMPOSITE FIBERS

According to the process of this invention described hereinabove, the assembly of composite fibers composed of at least two different fiber-forming polymers can be produced.

The assembly of composite fibers in accordance with the present invention is characterized by the fact that (1) it consists of numerous fibers, (2) at least 90% of said fibers have a non-circular cross-sectional shape, (3) the cross sections of at least 50% of said fibers differ from each other in at least one of shape and size, and (4) at least 50% of said fibers each have in their cross section taken at right angles to the fiber axis at least two side-by-side coalesced blocks of at least two different fiber-forming polymers with at least a part thereof being exposed to the peripheral surface of the fiber, at least one of the number, shape and size of the blocks varying from fiber to fiber. Thus, the fibrous assembly of the invention can be clearly distinguished from any of conventionally known assemblies of composite fibers.

When the fibrous assembly of the invention is cut at any position at right angles to the fiber axis, at least 90%, preferably at least 80%, especially preferably at least 70%, of the constituent fibers in this cross section have a non-circular cross-sectional shape. From FIGS. 7 to 16, most of the fibers constituting the assembly of the invention have a non-circular cross sectional shape.

According to this invention, the degree of cross-sectional non-circularity can be quantitatively expressed by the irregular shape factor (D/d) which is the ratio of the maximum distance (D) between two parallel lines circumscribing a fiber cross section to the minimum distance (d) between the two circumscribed parallel lines.

Each of the fibers having a non-circular cross section constituting the assembly of the invention preferably have an irregular shape factor of at least 1.1.

Furthermore, when the fibrous assembly of this invention is cut at an arbitrary position at right angles to the fiber axis, the cross sections of at least 50%, preferably at least 45%, especially preferably at least 40%, of the fibers differ from each other in at least one of shape and size.

According to this invention, the cross sections having a nonuniform shape and/or size can be distinguished by microscopic observations as can be seen from FIGS. 7 to 16.

According to the invention, the cross sections having different sizes can be determined quantitatively by the intra-assembly fiber cross-sectional area variation coefficient [CV(A)] given by the following equation $$CV(A) = \frac{\sigma(A)}{\bar{S}(A)}$$

wherein $\bar{S}(A)$ is the average of the cross-sectional sizes of 100 fibers which are obtained by sampling at random a partial assembly of 100 fibers from the fibrous assembly of the invention, and microscopically meassuring the cross-sectional sizes of the individual fibers in a cross section taken at an arbitrary position of the partial assembly, and $\sigma(A)$ is the standard deviation of the cross-sectional areas of the 100 fibers. Fibers having different cross-sectional sizes which constitute the fibrous assembly of the invention have a CV(A) of preferably 0.05 to 1.5, more preferably 0.1 to 1.5, especially preferably 0.2 to 1.

When a partial assembly of 100 fibers is sampled at random from the fibrous assembly of the invention and the cross sections of the individual fibers taken at an arbitrary position are observed microscopically, at least 50% of two cross sections sampled at random from the aforesaid cross sections preferably have (1) a shape distribution expressed by an irregular shape factor deviation ratio ($\alpha$) of the following formula $$\alpha = \frac{(D/d)_i - (D/d)_j}{(D/d)_j} \times 100\ (\%)$$

wherein $(D/d)_i$ represents a larger irregular shape factor, and $(D/d)_j$ represents a smaller irregular shape factor, or (2) a size distribution expressed by a cross-sectional deviation ratio of the following formula $$\beta = \frac{S_i - S_j}{S_j} \times 100\ (\%)$$

wherein $S_i$ is a larger cross-sectional size ($mm^2$), $S_j$ is a smaller cross-sectional size ($mm^2$), and $\beta$ is the cross-sectional area deviation ratio.

More preferably, the assembly of composite fibers in accordance with this invention is such that at least 50% of two cross sections sampled at random from the cross sections of the aforesaid fibers viewed by a microscope have (1) a difference in shape expressed by an irregular shape factor deviation ratio ($\alpha$) of at least 2%, and/or (2) a difference in cross sectional area expressed by a cross-sectional area deviation ratio ($\beta$) of at least 5%.

When the fibrous assembly of the invention is cut at an arbitrary position at right angles to the fiber axis, at least 50%, preferably at least 45%, more preferably at least 40%, of the fibers each have in their cross section at least two side-by-side coalesced blocks of at least two dissimilar fiber-forming polymer phases with at least a part thereof being exposed to the peripheral surface of the fiber, and at least one of the number, shape and size of the blocks vary from fiber to fiber. It should be understood that the side-by-side coalesced blocks exclude those blocks which are completely embraced within the fiber cross sections and are not exposed to the peripheral surfaces of the fibers.

FIGS. 7 to 16 show at least two side-by-side coalesced blocks in a cross section of a fiber in the fibrous assembly of the invention.

At least 50% of the fibers which constitute the fibrous assembly of the invention have a cross section having at least two side-by-side coalesced blocks in accordance with the above definition. It will be readily appreciated from the description of the process of this invention that the ratio of cross sections having at least two side-by-side coalesced blocks can be varied depending upon the state of formation of a molten macroblend phase and the size of the small openings in the spinneret.

The number of side-by-side coalesced blocks should be construed to be the number of independent blocks at least a part of which is exposed to the peripheral surface of the fiber. For example, in FIG. 3-*a*, the number of blocks contained in a small square area on the right top is four, and the number of blocks contained in a small square on the right bottom is three.

When a partial assembly of 100 fibers is sampled at random from the fibrous assembly of the invention and the cross section at an arbitrary position of each of the fibers is observed by a microscope, one cross section of each of the fibers contain preferably 1.5 to 30, more preferably 2 to 5, on an average of side-by-side coalesced blocks of at least two dissimilar fiber-forming polymer phases with at least a part thereof being exposed to the peripheral surface of the fiber. The average number of blocks of polymer phases in a fiber is referred to as $\overline{N}(B)$.

More preferably, the fibrous assembly of the invention has such a distribution of the number of blocks that the intra-assembly fiber block number variation coefficient [CV(AB)] expressed by the following formula is in the range of 0.05 to 1.0, preferably 0.1 to 0.8, especially preferably 0.15 to 0.7.

$$CV(AB) = \frac{\sigma(AB)}{\overline{N}(B)}$$

wherein $\overline{N}(B)$ is the average number of blocks in the cross sections of 100 fibers which is obtained by sampling a partial assembly of 100 fibers at random from the fibrous assembly of the invention, and microscopically measuring the number of blocks in each of the fibers in a cross section taken at an arbitrary position, and $\sigma(AB)$ is the standard deviation of the number of blocks in the 100 fibers.

The differences in the shape and size of the blocks among the fibers according to the above definition can be determined microscopically as can be seen from the drawings already cited hereinabove. If these differences need to be quantified, concepts corresponding to the irregular shape factor and the cross-sectional area variation coefficient described hereinabove may be introduced.

The fibrous assembly of composite fibers provided by this invention have an average fiber denier ($\overline{D}e$), as defined below, of 0.01 to 1,000 denier, preferably 0.05 to 800 denier, more preferably 0.1 to 500 denier.

The average denier size ($\overline{D}e$) in the assembly can be determined as follows:

Ten partial assemblies each consisting of 100 fibers are sampled at random from the fibrous assembly (for simplicity, three such partial assemblies may be used; the results are much the same for both cases), and each partial assembly is cut at one arbitrary position in the axial direction of fiber in a direction at right angles to the fiber axis. The cross section is then photographed through a microscope on a scale of about 2,000 times. The individual fiber cross sections are cut off from the resulting photograph, and their weights are measured. The total weight is divided by the total number of the cross-sectional microphotographs, and the result (m(A)) is calculated for denier (de).

Accordingly, the average denier size ($\overline{D}e$) in the assembly is calculated in accordance with the following equation.

$$\overline{D}e = K \cdot m(A)$$

wherein m(A) is the weight average value of the photographic fiber cross sections cut off; and K is a denier calculating factor defined by the equation $$K = \frac{9 \times 10^5 \cdot \rho}{\gamma \cdot \delta}$$

in which $\gamma$ is the weight (g) of the unit area of the photograph, $\delta$ is the ratio of area enlargement of the photograph, and $\rho$ is the specific gravity of the fiber-forming polymers, all of these values being expressed in c.g.s. unit.

The fibrous assembly of this invention may contain 2 to 5, preferably 2 to 3, dissimilar fiber-forming polymer phases.

In the assembly of composite fibers in accordance with this invention, at least two blocks in each fiber may respectively be composed of a single polymer phase, or of a microblend phase in which in a matrix of one polymer at least one other polymer is dispersed.

Thus, according to this invention, there is provided an assembly of fibers in which each block consists of a single polymer phase. There is also provided an assembly of fibers in which at least one block appearing in a fiber cross section by microscopic observation is coalesced with another block with a clear boundary line therebetween, said at least one block being composed of a matrix of at least one single polymer in which at least one other polymer is dispersed. FIG. 16 shows this embodiment.

According to this invention, each of the fibers which constitute the fibrous assembly of the invention preferably has an irregular periodic variation in the size of cross sectional area along its longitudinal length.

The variation in the size of cross sectional area can be expressed by the intrafiber cross-sectional area variation coefficient [CV(F)] given by the following formula.

$$CV(F) = \frac{\sigma(F)}{\bar{S}(F)}$$

Any 3 cm-length is selected in a given fiber of the fiber assembly, and the sizes of its cross-sectional areas taken at 1 mm intervals are measured by using a microscope. Then, the average ($\bar{S}(F)$) of the sizes of the thirty cross-sectional areas, and the standard deviation ($\sigma F$) of the thirty cross-sectional areas are calculated. Based on these values, CF(F) can be computed in accordance with the above equation.

Each of the composite fibers which constitute the fibrous assembly of this invention preferably has an intrafiber cross-sectional area variation coefficient [CV(F)] in the ragne of 0.05 to 1.0. FIG. 18 shows the intrafiber cross-sectional area variation of fibers obtained in Example 16 given hereinbelow.

Furthermore, at least 50% of constituent fibers in the fibrous assembly of the invention are such that when a 5-cm length of one fiber is selected and cut at 5 mm intervals at right angles to the longitudinal direction of the fiber and the resulting ten cross sections are observed by a microscope, the cross sections have at least two side-by-side coalesced blocks of at least two dissimilar fiber-forming polymer phases with at least a part thereof being exposed to the peripheral surface of the fiber, and in each of these cross sections, at least two of said blocks differing in size (area) exist.

The non-uniform sizes of blocks in a fiber cross section are shown in FIG. 19 which is a photograph taken of the fibers obtained in Example 6 given hereinbelow.

Thus, according to this invention, there is provided a novel filament composed of fiber-forming polymers, characterized by the fact that (1) said filament has a non-circular cross section and has an irregular shape factor (D/d), defined as the ratio of the maximum distance (D) between two parallel lines circumscribing said filament to the minimum distance (d) between these two circumscribed parallel lines, of at least 1.1, (2) said filament has an irregular periodic variation in the size of its cross-sectional area along its longitudinal direction, (3) when a 3 cm-length is taken out from said filament at an arbitrary position and the sizes of its cross-sectional areas taken at 1 mm intervals are measured by using a microscope, said filament has an intrafiber cross-sectional area variation coefficient [CV(F)] given by the following equation $$CV(F) = \frac{\sigma(F)}{\bar{S}(F)}$$

wherein $\bar{S}(F)$ is the average of the sizes of the thirty cross-sectional areas taken as above, and $\sigma(F)$ is the standard deviation of said thirty cross-sectional areas, of 0.05 to 1.0, and (4) when a 5 cm-length of said filament is taken and cut at 5 mm intervals at right angels to the longitudinal direction of the filament and the resulting ten cross sections are observed by a microscope, the cross sections have at least two side-by-side coalesced blocks of at least two dissimilar fiber-forming polymer phases with at least a part thereof being exposed to the peripheral surface of the filament, and in each of these cross sections, at least two of said blocks differing in size exist.

Examples of preferred fiber-forming polymers for the production of the fibrous assembly of composite fibers and the filaments of the invention are given below.

(1) Polyolefinic and polyvinyl-type polymers such as polyethylene, polypropylene, polybutylene, polystyrene, polyvinyl chloride, polyvinyl acetate, polyacrylonitrile, poly(acrylates), and interpolymers of these.

(2) Polyamides such as poly($\epsilon$-caprolactam), polyhexamethylene adipamide, and polyhexamethylene sebacamide.

(3) Polyesters such as phthalic acid, isophthalic acid, terephthalic acid, diphenyldicarboxylic acid, (3) Polyesters derived from a dibasic acid component which may be an aromatic dicarboxylic acid such as phthalic acid, isophthalic acid, terephthalic acid, diphenyldicarboxylic acid, or naphthalenedicarboxylic acid, an aliphatic dicarobxylic acid such as adipic acid, sebacic acid or decanedicarboxylic acid, or an alicyclic dicarboxylic acid such as hexahydroterephthalaic acid and a glycol component which may be an aliphatic, alicyclic or aromatic glycol such as ethylene glycol, propylene glycol, trimethylene glycol, tetramethylene glycol, decamethylene glycol, diethylene glycol, 2,2-dimethylpropanediol, hexahydroxylylene glycol or xylylene glycol, or a polyoxyalkylene glycol such as polyethylene glycol. Copolyesters in which one or both of the dibasic acid component and the glycol component consist of two or more compounds may also be used. Especially preferred polyesters are polyethylene terephthalate, polytetramethylene terephthalate, polytrimethylene terephthalate, and the polyester elastomers described in U.S. Pat. Nos. 3,763,109, 3,023,192, 3,651,014 and 3,766,146.

(4) Other polymers

Polycarbonates derived from various bisphenols, polyacetal, various polyurethanes, polyfluoroethylene, and copolyfluoroethylene.

In order to increase the plasticity or melt viscosity of the polymers, plasticizers, viscosity increasing agents, etc. may be added. Furthermore, the polymers may include usual additives for fibers, such as light stabilizers, pigments, heat stabilizers, fire retardants, lubricants, and delusterants.

The polymers are not necessarily linear polymers, and may be of a partially crosslinked three-dimensional structure so long as their thermoplastic properties are not impaired.

The assembly of composite fibers and the filaments in accordance with this invention are produced by using at least two kinds of the above polymers.

Preferably, the fibrous assembly of the invention consists of at least two dissimilar fiber-forming polymer phases having a difference in apparent melting point of at least 3° C., melting point of the polymer phase means [when the dissimilar polymer phases each consist of a single polymer, the apparent melting point of the polymer phase means that of the single polymer; and when at least one of the polymer phases consists of at least two dissimilar polymers, the apparent melting point is the sum of the products obtained by multiplying the mixing weight ratio of the dissimilar polymers (the total ratio being taken as 1) by the melting points (°C.) of the respective polymers].

Two dissimilar polymers mean not only two quite different kinds of polymers such as a combination of polyethylene terephthalate and polypropylene, but also a combination of polymers of the same kind but having different degrees of polymerization (for example, a combination of polyethylene trephthalate having an intrinsic viscosity of 0.96 and polyethylene terephthalate having an intrinsic viscosity of 0.49) or polymers of the same kind having different terminal groups (for example, a combination of polyamides having different kinds of terminal amino groups), or a combination of a linear polymer and a partially branched polymer of the same kind (for example, a combination of polyethylene terephthalate and polyethylene terephthalate having pentaerythritol as a branching agent copolymerized therewith). It should be understood that the two dissimilar polymers may also include a combination of two polymers having different melting points, specific gravities, hardnesses, degrees of crystalilzation, solvent resistances or dyeabilities, or a combination of two polymers having in the form of a fiber different heat shrinkages, orientation degrees, tenacities, elongations and polarizing properties.

More specifically, when for example, at least two dissimilar polymers are polyesters, these polyesters differ from each other in at least one of the following phsical properties and chemical properties.

(a) Physcial properties
- (i) Color: distinguishable by the naked eye
- (ii) Melting point: a difference of more than 3° C.
- (iii) Shrinkage in boiling water (upon air drying after dipping for 10 minutes in boiling water): a difference of more than 3%
- (iv) Specific gravity a difference of more than 0.03 g/cm$^3$.
- (v) Degree of crystallinity (measured by X-ray wide angle): a difference of more than 15%
- (vi) Intrinsic viscosity [$\eta$] (measured in o-chlorophenol or phenol/tetrachloroethane (=1/1)]: a difference of at least 0.05.
- (vii) Melting viscosity at the die temperature: a difference of at least 500 poises
- (viii) Strength of the assembly: a difference of more than 0.5 g/de
- (ix) Elongation of the assembly: a difference of more than 10%
- (x) Elastic recovery at 50% stretch: a difference of more than 10%.

(b) Chemical properties
- (i) Dyeability:
  Distinguishable with the naked eye by observation under an optical microscope at 400X.
- (ii) Chemical etching:
  After dipping in a chemical (an amine type, or alkaline solution) at 60° C. for 2 hours, distinguishable with the naked eye by observation under an electronic scanning microscope at 1,000X.

Among the differences in these physical and chemical properties, it is convenient to utilize the differences in color, melting point, boiling water shrinkage, degree of crystallization, intrinsic viscosity, strength of the assembly and the elongation of the assembly.

The dissimilar polymer phases in a filament can be easily distinguished by cutting the filament at right angles to its axis, and observing the cross section with a polarized microscope, or by placing it on a hot plate and observing its molten state by a microscope; or by dyeing the cross section and observing it with a microscope; or by scratching the cross-sectional surface by electron ion etching and observing the roughness of the surface with an electron scanning microscope (for example, at a magnification ratio of about 1000).

According to the process of this invention described above, polymers heretofore used in melt-spinning processes, such as polyethylene terephthalate, poly($\epsilon$-caprolactam), polyhexamethylene adipamide, polyethylene, polypropylene, polystyrene, and polytetramethylene terephthalate can be advantageously utilized. Furthermore, the process of this invention makes it possible to easily fiberize polycarbonates and polyester elastomers which have been considered difficult to melt-spin industrially. In addition, composite fibers can be produced from at least two dissimilar polymers which have heretofore been difficult to form into composite fibers because of the large differences in the degree of polymerization, and therefore in melt viscosity.

In the assembly of composite fibers in accordance with this invention, at least two dissimilar polymer phases each have at least two side-by-side coalesced blocks, and therefore, as already stated with regard to the manufacturing process, when the two blocks are composed of two dissimilar polymer phases having no adhesiveness to each other, partial splitting treatment can give a fibrous assembly in which the polymer phases are separated from each other along the fiber axis to form finer fibers.

The assembly of composite fibers of the invention which is partially split is such that when 100 fibers are sampled at random from the assembly, at least 20% of these sampled fibers irregularly have in their longitudinal direction (a) a portion wherein when their cross sections taken at right angles to the fiber axis are observed with a microscope, at least two dissimilar fiber-forming polymer phases are coalesced with each other side by side with at least a part thereof being exposed to the periphery of the fibers, and (b) a portion wherein said at least two side-by-side coalesced dissimilar fiber-forming polymer phases are separated along the longitudinal direction of the fibers at any arbitrary boundary thereof and are made into finer fibers.

The states of the portions (a) and (b) are shown in FIG. 20 which is a photograph of the cross sections of one fiber obtained in Example 5.

Furthermore, since in the fibrous assembly of composite fibers in accordance with this invention, at least two dissimilar polymer phases have at least two side-by-side coalesced blocks, treatment utilizing the difference in shrinkage between the dissimilar polymer phases, for example boiling water treatment, gives an assembly in which the individual fibers are irregularly crimped.

Furthermore, according to this invention, the assembly of composite fibers is provided in the form of short fibers.

Such short fibers have an average fiber length of not more than 200 mm, preferably not more than 150 mm. The fiber assembly of this invention cut to short fibers may be used as such or as a mixture with other fibers. If the fiber assembly of this invention is contained in the mixture in an amount of at least 50% by weight, preferably at least 60% by weight, the characteristic features of the fiber assembly of this invention can be exhibited. Furthermore, the short fibers, either alone or in combination with other short fibers, may be used to produce spun yarns.

The cross-sectional size and shape of the fiber assembly of this invention, the distribution thereof, and the variations in the number, shape and size of blocks in a fiber cross section taken at right angles to the fiber axis are within certain fixed ranges, and such an assembly of composite fibers cannot be obtained by known fiber manufacturing methods. The structural properties of the assembly are interesting and have not been obtained heretofore.

The distribution of the cross sectional areas of the fibers in the fiber assembly and the distribution of the number of blocks in the assembly are measured with regard to the fibers obtained in Example 16, and Examples 6 and 19, and are shown in FIGS. 21 and 22.

The ranges of such cross-sectional size and shape, the distribution thereof, and the variations of blocks along the fiber axis are partly similar to those of natural fibers such as silk and wool, and therefore, the present invention can provide synthetic composite fibers which have similar tactile hand and properties to natural fibers.

Thus, the fiber assembly of this invention can be used as a material for woven or knitted fabrics, non-woven fabrics and other fibrous products.

In many cases, the fiber assembly of this invention develops crimps to a greater degree by heat-treatment because of the proper irregularity in the fiber cross section along the longitudinal direction and of the anisotropic cooling effect imparted at the time of forming the fibers. This property can be utilized in increasing fiber entanglement.

The fiber assembly of this invention is also useful in producing crosslaid nonwoven fabrics, randomlaid unwoven fabrics obtained by application of electrostatic charge or air, artificial leathers, etc.

The following Examples illustrate the present invention more specifically without any intention of limiting the invention thereby.

EXAMPLE 1

A fiber assembly was produced from chips of 6-nylon (melting point 488° K.; intrinsic viscosity 1.3) and chips of polypropylene (melting point 438° K.; melt index 15) by using an apparatus of the type shown in FIG. 4.

Chips of 6-nylon were continuously metered and fed into an extruder A having an inside diameter of 30 mm and melted and kneaded at 200° to 300° C. The molten polymer was sent to a mixer section 6 at a rate of 17 g/min. by means of a gear pump 4*a*. Simultaneously, chips of polypropylene were continuously metered and fed into an extruder B having an inside diameter of 30 mm and melted and kneaded at 240° to 310° C. The molten polymer was sent to the mixer section 6 at a rate of 14 g/min. by means of a gear pump 4*b*. The molten nylon and polypropylene were mixed at the mixing section 6 by means of Kenics-type mixer consisting of 10 elements. The mixture was extruded by means of an I-die through a mesh spinneret 9 having a band-like fiber-forming area with a size of 160 mm×5 mm and composed of one 32-mesh plain weave wire mesh. At this time, air was jetted toward the fiber-forming area of the spinneret at a rate of 9 m/sec. by means of a cooling device 11 having an air jet nozzle and located immediately below the spinneret. Under the fiberizing conditions shown in Table 1, the polymer melts were spun to give an assembly of composite fibers having 37,000 denier.

The principal properties of the resulting assembly of composite fibers are shown in Table 2.

EXAMPLE 2

An assembly of composite fibers was produced under the fiberizing conditions shown in Table 1 by means of an apparatus of the type in FIG. 4 in which a Kenics-type static mixer consisting of 16 elements was provided at the mixer section 6 and the spinneret had a fiber-forming area with a size of 160 mm×5 mm and was composed of one 50-mesh special twill weave wire mesh.

A microphotograph of the resulting assembly taken along its cross section is shown in FIG. 7-*a*. FIGS. 7-*b* and 7-*c* show similar microphotographs taken after the fiber assembly was cold drawn to about 3 times and then heat-treated for 10 minutes in boiling water.

It is seen from these photos that the fiber assembly was easily split at the interface of the different polymer phases having a lamellar mixed state in a fiber cross section. FIG. 7-*b* shows that split portions and non-split portions existed together.

It is clearly seen from FIGS. 7-*a,* 7-*b* and 7-*c* that at least 95% of the fibers constituting the assembly had a non-circular cross section.

EXAMPLE 3

There was used an apparatus of the type shown in FIG. 4 in which the spinneret consisted of a laminate of 12-mesh, 30-mesh and 45-mesh plain weave wire meshes (three wire meshes in total), and there was used a Kenics-type static mixer consisting of 20 rows of parallel-aligned elements, each row consisting of six elements. Chips of polyethylene terephthalate (melting point 540° K.; intrinsic viscosity 0.71) and chips of polypropylene (melting point 438° K.; melt index 15) were melt-spun under the fiberizing conditions shown in Table 1.

While the interface between the polymer phases in a fiber cross section of the assembly obtained in each of Examples 1 and 2 was smooth and curved, it was found that in a cross section of the fibers obtained in this Example, the interface between the polymer phases was intricate.

The fiber assembly could be drawn under the conditions shown in Table 1.

EXAMPLE 4

There was used an apparatus of the type shown in FIG. 4 in which a laminate plate type static mixer consisting of about 800 plates having a depressed portion as shown in FIG. 6-*b* and each having a length of 2 cm, a width of 5 cm and a thickness of 200 microns was installed inside a die 8 so as to mix the same polymethylene terephthalate, and polypropylene melts as used in Example 3 in a lamellar structure, and the spinneret consisted of one 70-mesh plain weave mesh having an opening area ratio [(p−d)/p] of 0.294 (an opening ratio of 29.4%). An assembly of composite fibers was produced under the fiberizing conditions shown in Table 1 and taken up at a rate of 20 m/min.

The average denier size of the resulting composite fibers, determined statistically from a microphotograph of the resulting fiber assembly taken along its cross section, was 0.9 denier.

The average number of blocks [$\overline{N}$(B)] in the resulting assembly determined from the aforesaid microphotograph was 4.0.

The microphotograph showed no fiber having a quadrangular outer configuration which consisted of a single polymer phase in cross section instead of side-by-side coalesced polymer phases.

It was found that the composite fibers obtained in this Example could be easily drawn on a hot plate of the type shown at 13 in FIG. 4.

EXAMPLE 5

There was used an apparatus of the type shown in FIG. 4 in which a Kenics-type static mixer consisting of 6 elements each having an outside diameter of 14 mm and a length of 21 mm was set at the mixer section 6 and a Kenics-type static mixer consisting of 16 rows of parallel-aligned elements with each row consisting of four elements aligned in series as shown in FIG. 5, and the spinneret had a fiber-forming area in rectangular shape with a size of 390 mm×20 mm.

In this Example, one 30-mesh plain weave wire mesh was used at the spinneret, and the same polyethylene terephthalate and polypropylene as used in Example 3 were used.

First, in order to examine the mixed state of the two polymers, the wire mesh was not attached to the fiber-forming area of the spinneret, but a rectangular stainless steel polymer receiving box was provided. The mixed molten polymer was sampled into the receiving box, and cooled in water as such. It was thus quickly solidified while keeping the mixed state of the polymers unchanged. The resulting polymer mixture sample was cut in a plane parallel to the spinneret face, and photographed through a microscope. The microphotograph is shown in FIG. 24. From a plurality of such microphotographs, the effective average cord length [$\overline{L}$(c)] and the length of a boundary line [N(p)·L(p)] between dissimilar polymer phases, as defined in the specification, were measured, and found to be 0.42 mm and 373 mm, respectively. It is seen therefore that the length of the boundary line is sufficiently longer than the average length of the partitioning member.

The 30-mesh plain weave wire mesh was set at the spinneret as partitioning members, and the polymers were spin under the fiberizing conditions shown in Table 1. There was obtained a fiber assembly having a total denier size of 225,000 denier and an average monofilament denier size of 10 denier.

The average number of blocks [$\overline{N}$(B)] of the assembly in a fiber cross section was 5.5, and from the effective average cord length [$\overline{L}$(c)] showing the mixed state of the polymers, the average theoretical number of blocks [$\overline{N}$o(B)] calculated in accordance with the equation given in the specification was 5.0, thus showing a good correspondence between [$\overline{N}$(B)] and [$\overline{N}$o(B)].

The microphotograph in FIG. 10 shows that more than 95% of the constituent fibers of the resulting assembly had a non-circular cross-sectional shape, and the two polymer phases are aligned side by side in a lamellar structure. The block portion of the fiber cross-section represents a dyed polyethylene terephthalate portion.

The resulting fiber assembly was drawn to about 3.5 times at a rod surface temperature of 80° to 120° C. in a drawing zone in which three heated rod having an outside diameter of about 5 cm containing a cartridge heater built therein and two rods which were not positively heated were arranged alternately. The drawn fiber assembly had the properties shown in Table 2 which indicate good usability of the assembly as a material for general fibrous products.

The drawn fiber assembly could be easily split by mechanical crumpling.

One fiber was sampled from the mechanically crumpled boundary portion of the fiber assembly, and cut at 5 mm intervals along its longitudinal direction. The variations in the size of the cross section in the longitudinal direction are shown in a microphotograph given in FIG. 20. It is seen that at the positions 1 to 4, the fiber assembly did not undergo positive splitting treatment, but at the positions 5 to 10, it was positively split. In FIG. 20, the number of the blocks remained the same along a 5-cm length of the fiber, and it was easy to determine from which blocks of the non-split fiber each of the blocks of the split fiber was formed.

In FIG. 20, the blocks are numbered as 1 to 6.

EXAMPLE 6

Example 5 was repeated except that one 45-mesh plain weave wire mesh shown in FIG. 1-*a* was used instead of the 30-mesh plain weave wire mesh as the material for the extrusion surface of the spinneret. The resulting assembly of composite fibers was examined for variations in shape and variations in the number of blocks in a fiber cross section.

The mixed state of the polymers is shown in FIG. 24. The cross section of the resulting fiber assembly was photographed through a microscope and is shown in FIG. 11.

The average number of blocks in the assembly, measured from a plurality of such cross-sectional photographs, was 3.3 which well corresponded with the theoretical average number of blocks calculated from the effective average cord length [$\overline{L}$(c)] showing the mixed state of the polymers.

From a plurality of cross-sectional photographs like FIG. 11, the distribution of the numbers of blocks in the fiber assembly was determined, and is shown by a bar graph in FIG. 22-*a*. The intra-assembly block number variation coefficient [CV(AB)], determined from this graph, was 0.34.

It is seen from FIG. 11 that more than 90% of the fibers constituting the assembly had a non-circular cross-sectional shape, and more than 95% of fibers had different polymer phases aligned side by side in a fiber cross section.

One fiber was selected from the undrawn fiber assembly, and cut at 5 mm intervals along a 5-cm length in the axial direction. The variations in the fiber cross sections were traced, and are shown in FIG. 19. From the microphotograph of the 10 fiber cross sections, only the fiber cross sections were cut off and rearranged and adhered to make FIG. 19. It is easily understood from this Figure that in the cross sections of one fiber, the size of the blocks varies slightly over its 5 cm length, but the number of blocks remains unchanged. The shapes of the blocks change partly symmetrically and partly non-symmetrically.

The fiber assembly could be drawn in the same way as in Example 5.

When the drawn fiber assembly was heat-treated at 170° C., there was obtained a fiber assembly of composite fibers having a randomly crimped structure as shown in FIG. 26.

The other features are shown in Tables 1 and 2.

EXAMPLE 7

Example 5 was repeated except that a 12-mesh plain weave wire mesh was used instead of the 30-mesh plain weave wire mesh.

FIG. 12 shows a photograph of the cross section of the resulting undrawn fiber assembly of composite fibers. It is seen that thick fibers having an average monofilament size of 106 denier experienced fiber-forming attenuation within a very short range represented by a solidification length of less than 1 cm.

The solidification length [P(s)] was measured as follows:

In a stage where the fibers were formed stably, the gear pump was stopped to stop the extrusion of the molten polymer abruptly while blowing a large amount of low-temperature air cooled with dry ice against the polymer. Thus, many fine fibrous streams were instantaneously frozen. A sample was taken from these fine fibrous streams and the solidification length was measured by microscopically examining the sample.

EXAMPLE 8

Example 5 was repeated except that a 40-mesh twill weave wire mesh as shown in FIG. 1-*b* was used instead of the 30-mesh plain weave wire mesh.

The cross section of the resulting undrawn assembly of composite fibers was photographed through a microscope, and the microphotograph is shown in FIG. 13.

The mixed state of the polymers before cutting with the partitioning members was the same for Examples 5 to 10, and can be seen from the microphotograph of FIG. 24.

As a result of using the aforesaid partitioning members (40-mesh twill weave wire mesh), the irregular shape factor (D/d) of the fiber cross section was more than 2, and the intra-assembly block number variation coefficient [CV(AB)] was as large as 0.45.

The other features and the fiber properties are given in Tables 1 and 2.

EXAMPLE 9

Example 5 was repeated except that an etched porous plate shown in FIG. 1-*d* was used instead of the 30-mesh plain weave wire mesh.

The etched porous plate was made as follows:

A photocurable resin was coated on the surface of a stainless steel plate, and a negative film bearing the desired pattern was superimposed on the coated surface. Light was irradiated onto the assembly to cure those portions of the surface resin layer which were not to be chemically etched. The uncured areas were washed out, and the rest was etched in a chemical etchant solution capable of corroding the stainless steel to form a mesh-like porous plate having the pattern shown in FIG. 1-*d*. Then, the photocured areas remaining on the surface were washed out. This procedure is characteristic in that a mesh-like porous plate having a desired pattern can be produced at low cost. In the porous plate used in this Example, the triangle ABC shown in FIG. 1-*d* was an equilateral triangle with one side measuring 0.5 mm.

The cross-section of the resulting undrawn fiber assembly of composite fibers obtained in this Example was photographed, and the photograph is shown in FIG. 14. It is seen from this figure that more than 90% of the fibers in the assembly had a non-circular cross section shape, and in the cross sections of more than 90% of the fibers in the assembly, blocks of dissimilar polymer phases were coallesced side by side.

The average number of blocks in the fiber assembly in a fiber cross section well corresponded with the expected theoretical average number of blocks [$\overline{N}o(B)$].

The fiber assembly could be drawn as in Examples 5 to 8.

The other features and the fiber properties are given in Tables 1 and 2.

EXAMPLE 10

Example 5 was repeated except that a sintered wire mesh obtained by laminating in a bias direction a 40-mesh plain weave wire mesh and a 30-mesh plain weave wire mesh specially woven from fine wires usually employed for producing 70-mesh plain weave wire meshes and specially sintering the laminate was used instead of the 30-mesh plain weave wire mesh.

The cross section of the resulting fiber assembly was as shown by the microphotograph of FIG. 15. There was a tendency that the irregular shape factor (D/d) was large and the intra-assembly block number variation coefficient [CV(AB)] was somewhat as high as 0.54.

Even after the fiber assembly was drawn, the irregular shape factor and the intra-assembly block number variation coefficient tended to be large.

The other features and the fiber properties are shown in Tables 1 and 2.

EXAMPLE 11

There was used an apparatus of the type shown in FIG. 4 having two extruders A and B having a cylinder diameter of 30 mm. In the extruder A, 35 parts by weight of chips of polyethylene terephthalate (melting point 540° K.; intrinsic viscosity 0.71) and 15 parts by weight of chips of polypropylene (melting point 438° K.; melt index 15) were mixed and the microblend melt was extruded. From the extruder B, 50 parts by weight of chips of polypropylene (melting point 438° K.; melt index 15) were extruded. At the mixer section 6 and the inside of the die 8 in FIG. 4, these molten polymers from the extruders A and B were mixed. The mixed state of the polymer phases from the extruders A and B is shown in a microphotograph of FIG. 25 taken through a stereomicroscope. One graduation in the scale at the bottom of the photograph correspond to 1 mm. The block portion shows the polymer A phase in which polyethylene terephthalate and polypropylene from a microblend, and the white portion shows the polymer B phase composed only of polypropylene.

When the mixed polymer melt consisting of dissimilar polymer phases as shown in FIG. 25 was partitioned and cut by using a 45-mesh plain weave wire mesh, there was obtained an assembly of composite fibers having side-by-side coalesced blocks of different polymer phases as shown in FIG. 16.

It is clearly seen from FIG. 16 that the polymer A phase is a microblend of polyethylene terephthlate and polypropylene.

The average number of blocks in the assembly composed of the phases of polymers A and B well corresponded with the theoretical average number of blocks. When this is compared with Example 6, it is seen that even when in each of the dissimilar polymer phases, the polymers are in the state of a microblend, it is not detrimental to the technique of controlling a macroblend state in accordance with this invention.

The other features and the fiber properties are shown in Tables 1 and 2.

EXAMPLES 12 TO 14

Example 5 was repeated except that a 50-mesh plain weave wire mesh was used instead of the 30-mesh plain weave wire mesh, and the number of elements of a Kenics-type static mixer to be set at the mixer section 6 in FIG. 4 was changed as shown below.

In Example 12, ten Kenics-type static mixer elements were used, and polyethylene terephthalate (melting point 540° K.; intrinsic viscosity 1.00) and 6-nylon (melting point 488° K.; intrinsic viscosity 1.3) were melt-spun under the fiberizing conditions shown in Table 1 to form an assembly of composite fibers.

In Example 13, thirteen Kenics-type static mixer element were used, and polyethylene terephthalate (melting point 540° K.; intrinsic viscosity 1.00) and a polyester elastomer (Hytrel 4056, melting point 441° K.; a product of E. I. du Pont de Nemours & Co.) were melt-spun under the fiberizing conditions shown in Table 1 to give an assembly of composite fibers.

In Example 14, sixteen Kenics-type static mixer elements were used, and 80 parts by weight of polyethylene terephthalate (melting point 540° K.; intrinsic viscosity 1.00) and 20 parts by weight of polybutylene terephthalate (melting point 499° K.; intrinsic viscosity 1.15) were melt-spun under the fiberizing conditions shown in Table 1 to give an assembly of composite fibers.

In Examples 13 and 14, the polymer phases are composed of dissimilar polyesters.

In Example 14, the technique of controlling a macroblend state in accordance with this invention could be performed well even when the weight ratio between the polymer A phase and the polymer B phase varied greatly.

The fiber assemblies obtained in Examples 12 to 14 were each drawn on a hot plate having a length of 600 mm and a width of 600 mm as shown in FIG. 4.

The other features and the fiber properties are shown in Tables 1 and 2.

EXAMPLE 15

Using the same polymer phases as in Example 13, a mixed polymer melt of a very fine lamellar structure was prepared by using a Kenics-type static mixer consisting of 20 elements set at the mixer section 6 of the apparatus as shown in FIG. 4. The mixed polymer melt was spun by using a 80-mesh plain weave wire mesh under the fiberizing conditions shown in Table 1. Then, the resulting fiber assembly was drawn under the same conditions as in Example 13 using a hot plate of the type shown in FIG. 4 to give a drawn assembly of composite fibers.

In spite of the fact that the undrawn assembly of composite fibers was very fine as represented by its average monofilament denier size of 0.9 denier, the average number of blocks [$\overline{N}$(B)] in the assembly was close to the expected theoretical average number of blocks.

The other features and the fiber properties are shown in Tables 1 and 2.

EXAMPLE 16

The same polyethylene terephthalate (70 parts) and polybutylene terephthalate (30 parts) as used in Example 14 were melt-spun and drawn under the fiberizing conditions shown in Tables 1 and 2 by using an apparatus of the type shown in FIG. 4 in which a Kenics-type static mixer consisting of 13 elements was set at the mixer portion, and the same sintered wire mesh as used in Example 10 was used.

The distribution of the denier sizes of the drawn assembly of composite filament at 0.5 denier intervals is shown in the bar graph of FIG. 21. It is seen that the assembly had such a distribution of denier size that the intra-assembly cross-sectional area variation coefficient [CV(A)] was within a certain fixed range.

FIG. 21 shows the denier distribution of arbitrarily sampled 100 fibers of the drawn assembly. The individual bars in the graph of FIG. 21 show the numbers of the fibers present in 0.5 denier intervals. For example, counting from the left, the first bar shows that the number of fibers having a size of less than 0.5 denier is 1; the second bar shows the number of fibers having a size between 0.5 denier to 1.0 denier (exclusive) to be 6; the third bar shows the number of fibers having a size of from 1.0 denier to 1.5 denier (exclusive) to be 8; and the fourth bar shows the number of fibers having a size of from 1.5 denier to 2.0 denier (exclusive) to be 12.

One composite fiber was arbitrarily sampled from the drawn assembly of composite fibers, and cut at 1 mm intervals in the longitudinal direction of the fiber. The variation in cross-sectional area along the fiber length was measured from thirty microphotographs of these sections, and is shown in FIG. 18. It is seen that the selected fiber had a slightly smaller denier size than the average denier of the assembly, and varies in cross-sectional area at about 2 or 3 denier. The intrafilament cross-sectional area variation coefficient of the selected filament [CV(F)] was 0.16. In view of the average value of CV(F) of the assembly which was 0.30, the selected fiber incidentally had a slightly smaller cross-sectional area variation.

When the drawn composite fibers were heat-treated at 170° C., crimps were formed at a rate of 14.5 per inch.

When a filamentary web was produced from the heat-treated assembly of composite fibers, bulky bed stuffings were obtained.

When the heat-treated assembly of composite fibers was cut to a length of about 50 mm, and the resulting staples were processed on a carding machine, bulky bed stuffings could be obtained.

Thus, the assembly of composite fibers in accordance with this invention can be used as bed stuffings both in the form of filaments and staples.

The other features and the fiber properties are shown in Tables 1 and 2.

EXAMPLE 17

There was used an apparatus of the type shown in FIG. 4 in which a laminated plate type static mixer of the type shown in FIG. 6-*b* was set in the inside of the die 8. The mixer consisted of a laminate of 270 plates having a width of 5 cm, a height of 1 cm and a thickness of 0.6 mm with the depth of each depressed portion being 0.37 mm. Polyethylene terephthalate (melting point 540° K.; intrinsic viscosity 1.00) and polyethylene terephthalate having 2% by weight of 5-sodium sulfoisophthalate copolymerized therewith (melting point 520° K.; intrinsic viscosity 0.49) were mixed in layers by using the aforesaid mixer, and the resulting molten mixture of different polymer phases was partitioned and cut with a 50-mesh plain weave wire mesh to give an assembly of composite fibers having about 2 blocks on an average in the assembly.

Since the polyethylene terephthalate having 5-sodium sulfoisophthalate copolymerized therewith could be easily dyed with a cationic dye, the number of blocks in the cross section of the fiber assembly could be easily analyzed.

EXAMPLES 18 AND 19

The same laminated plate type static mixer as in Example 17 was set at the inside of the die in an apparatus of the type shown in FIG. 4. Polyethylene terephthalate (melting point 540° K.; intrinsic viscosity 1.00) and polypropylene (melting point 438° K.; melt index 15) were mixed in layers, and the melting point was partitioned and cut with one 50-mesh plain weave wire mesh under the fiberizing conditions shown in Table 1.

The laminar molten polymer mixture obtained was sampled and solidified by the method shown in Example 5, and the laminar mixed resin was cut parallel to the surface of the spinneret. The surface of the cut section was observed and is shown in the microphotograph of FIG. 23-*a*. When the solidified mixed resin was separated at the boundary surface of the polymer phases in a lamellar structure by applying a slightly bending force, and its deep inside was observed. Each of the polymer phases was like a distorted curved layer as shown in FIG. 23-*b*.

In Example 18, the plain weave wire mesh was fixed so that the openings of the wire mesh were aligned parallel to the boundary lines of the polymer phases in the lamellar molten mixture. In Example 19, the plain weave wire mesh was fixed so that the openings of the wire mesh were aligned in a bias direction to the boundary lines of the polymer phases in the lamellar molten mixture.

The photograph of the cross section of the undrawn fiber assembly of composite fibers obtained in Example 18 is shown in FIG. 8.

The photograph of the cross section of the undrawn fiber assembly of composite fibers obtained in Example 19 is shown in FIG. 9.

FIGS. 8 and 9 show that even when the mixed state of the polymer phases is the same, the position of an interface between the polymer phases in a fiber cross section varies depending upon the arrangement of the extrusion surface of the spinneret.

It is noteworthy that a macroblend obtained by using the laminated plate type static mixer gives a lesser intra-assembly block number variation coefficient [CV(AB)] than does a macroblend obtained by using a Kenics-type static mixer; in other words, the distribution of the numbers of blocks becomes sharper, and fibers of the same number of blocks formed the assembly.

This can be well understood from FIG. 22-*b* which is a bar graph showing the distribution of the number of blocks in the undrawn assembly of composite fibers obtained in Example 19. This can be better understood from a comparison of FIG. 22-*b* with FIG. 22-*a* which is a similar bar graph plotted with regard to the fibrous assembly obtained in Example 6.

The irregular shape factor deviation ratio [a] and the cross-sectional area deviation ratio [$\beta$] defined in the specification are determined for ten fibers in Example 19, and are listed below.

$\alpha$: 3.1, 28.7, 18.0, 6.4, 6.4, 28.1, 13.8, 8.9, 15.9, 3.2.

$\beta$: 21.0, 27.8, 15.0, 9.5, 8.7, 17.4, 4.5, 35.2, 50.0, 21.0.

Most of the them satisfied the relations $\alpha > 2$, $\beta > 5$.

The other features and the fiber properties are shown in Tables 1 and 2.

COMPARATIVE EXAMPLE 1

Example 1 was repeated except that no static mixer was used at the mixing portion 6 of the apparatus shown in FIG. 4. The molten 6-nylon and polypropylene could not be mixed in the fiber-formng area of the spinneret 9 but were extruded as deviated streams. Even when conditions for cooling air to be jetted out from the cooling device 11 were varied, the 6-nylon portion was overcooled, and on the other hand, the polypropylene portion extruded was not cooled to an optimal viscosity but became plastic-like.

COMPARATIVE EXAMPLE 2

Example 2 was repeated except that in addition to the 50-mesh special twill weave wire mesh, a sintered metallic structure having a thickness of 2 cm and an effective hole-diameter of 100 microns was inserted into the die.

The resulting undrawn assembly of fibers was cut to a thickness of 7 microns of a microtome and the 6-nylon portion of the cut cross section was dyed. The cross section was then analyzed by taking its photograph. The boundary between the polyethylene terephthalate phase and the 6-nylon phase was so disturbed that clear blocks of dissimilar polymer phases could not be distinguished.

In Table 1, the following abbreviations were used.

Ny-6: nylon-6
PP: polypropylene
PET: polyethylene terephthalate
PEs-Elas: polyester elastomer
PBT: polybutylene terephthalate
A: Kenics-type static mixer
B: laminated plate type static mixer
C: plain weave wire mesh
D: special twill weave wire mesh
E: twill weave wire mesh
F: etched porous plate
G: specially sintered wire mesh
bd: immediately before the I-die
id: inside the I-die

TABLE 1

| | | Items | | Unit | Example-1 | Example-2 | Example-3 | Example-4 | Example-5 | Example-6 | Example-7 | Example-8 | Example-9 |
|---|---|---|---|---|---|---|---|---|---|---|---|---|---|
| Polymer | 1 | A (parts) | | (wt %) | Ny-6 (55) | PET (55) | PET (60) | PET (50) | PET (60) | PET (60) | PET (60) | PET (80) | PET (60) |
| | 2 | B (parts) | | (wt %) | PP (45) | Ny (45) | PP (40) | PP (50) | PP (40) | PP (40) | PP (40) | PP (40) | PP (40) |
| Mixer | 3 | Type | | | A | A | A | B | A | A | A | A | A |
| | 4 | Number | | | 10 | 16 | 6 × 20 rows | 800 | 4 × 16 rows + 6 | 4 × 16 rows + 6 | 4 × 16 rows + 6 | 4 × 16 rows + 6 | 4 × 16 rows + 6 |
| | 5 | Position | | | bd | bd | id | id | id + bd | id + bd | id + bd | id + bd | id + bd |
| | 6 | Plate thickness | $t_1$ | mm | — | — | — | 0.20 | — | — | — | — | — |
| | 7 | Depressed depth | $t_2$ | mm | — | — | — | 0.12 | — | — | — | — | — |
| Mixing condition of the polymers | 8 | Length of boundary line/cm$^2$ | $\underline{N}(p) \cdot \underline{L}(p)$ | mm | 296 | 540 | 253.4 | 500 | 373 | 373 | 373 | 373 | 373 |
| | 9 | Effective average cord length | L(c) | mm | 0.53 | 0.29 | 0.62 | 0.2 | 0.42 | 0.42 | 0.42 | 0.42 | 0.42 |
| | 10 | Material of the extrusion surface | | | C | D | three C | C | C | C | C | E | F |
| | 11 | Average length of the partition members | $\bar{L}(w)$ | mm | 3.175 | 2.034 | 2.258 | 1.451 | 3.387 | 2.258 | 8.467 | 2.540 | 1.500 |
| | 12 | Theoretical block number | $\bar{N}o(B)$ | | 4.0 | 4.5 | 2.8 | 4.6 | 5.0 | 3.7 | 11.0 | 4.0 | 2.8 |
| | 13 | Total fiber-forming area | $\underline{S}o$ | cm$^2$ | 8 | 8 | 32 | 16 | 78 | 78 | 78 | 78 | 78 |
| | 14 | Average distance between extrusion openings | p | mm | 0.623 | 0.532 | 0.443 | 0.285 | 0.664 | 0.443 | 1.661 | 0.664 | 0.392 |
| | 15 | Average hill height | $\bar{h}$ | mm | 0.185 | 0.137 | 0.153 | 0.109 | 0.183 | 0.153 | 0.290 | 0.152 | 0.150 |
| | 16 | Average hill width | $\bar{d}$ | mm | 0.386 | 0.338 | 0.277 | 0.201 | 0.395 | 0.277 | 0.759 | 0.423 | 0.233 |
| | 17 | $\bar{h}/\bar{d}$ | | — | 0.479 | 0.405 | 0.552 | 0.542 | 0.463 | 0.552 | 0.382 | 0.359 | 0.643 |
| | 18 | Opening area ratio | $(\bar{p}-\bar{d})/\bar{p}$ | — | 0.380 | 0.365 | 0.375 | 0.294 | 0.405 | 0.375 | 0.543 | 0.363 | 0.405 |
| Fiberizing conditions | 19 | Extruder temperature | — | °C. | 200–310 | 200–320 | 200–320 | 200–320 | 260–310 | 260–310 | 260–310 | 260–310 | 260–310 |
| | 20 | Die temperature | — | °C. | 220–280 | 250–305 | 260–305 | 260–305 | 270–280 | 270–280 | 270–280 | 270–280 | 270–280 |
| | 21 | Amount of extrusion (A + B) | W | g/min | 31 | 38 | 69 | 23 | 100 | 100 | 100 | 100 | 100 |
| | 22 | Velocity of cooling air | V(y) | m/sec | 9 | 7 | 8 | 8 | 12 | 11 | 11 | 11 | 12 |
| | 23 | Take up speed | V(l) | cm/min | 750 | 1000 | 800 | 2000 | 400 | 400 | 400 | 400 | 400 |
| | 24 | Total denier | ΣDe | de | 37,000 | 34,000 | 78,000 | 10,500 | 225,000 | 225,000 | 225,000 | 225,000 | 225,000 |
| | 25 | Solidification length | P(s) | cm | 0.48 | 0.23 | 0.25 | 0.21 | 0.42 | 0.29 | 0.55 | 0.36 | 0.31 |
| | 26 | Packing fraction | PF | — | $4.98 \times 10^{-3}$ | $3.75 \times 10^{-3}$ | $2.27 \times 10^{-3}$ | $6.30 \times 10^{-4}$ | $2.70 \times 10^{-3}$ | $2.70 \times 10^{-3}$ | $2.70 \times 10^{-3}$ | $2.70 \times 10^{-3}$ | $2.70 \times 10^{-3}$ |

| | | Items | | Unit | Example-10 | Example-11 | Example-12 | Example-13 | Example-14 | Example-15 | Example-16 | Example-17 | Example-18 | Example-19 |
|---|---|---|---|---|---|---|---|---|---|---|---|---|---|---|
| Polymer | 1 | A (parts) | | (wt %) | PET (60) | PET/PP (35/15) | PET (50) | PET (50) | PET (80) | PET (50) | PET (70) | PET ($\eta$ = 1.00) (50) | PET (50) | PET (50) |
| | 2 | B (parts) | | (wt %) | PP (40) | PP (50) | Ny (50) | PEs-Elas (50) | PBT (20) | PEs-Elas (50) | PBT (30) | PET ($\eta$ = 0.99) (50) | PP (50) | PP (50) |
| Mixer | 3 | Type | | | A | A | A | A | A | A | A | B | B | B |
| | 4 | Number | | | 4 × 16 rows + 6 | 4 × 16 rows + 6 | 10 | 13 | 16 | 20 | 13 | 270 | 270 | 270 |
| | 5 | Position | | | id + bd | id + bd | bd | bd | bd | bd | bd | id | id | id |
| | 6 | Plate thickness | $t_1$ | mm | — | — | — | — | — | — | — | 0.60 | 0.60 | 0.60 |
| | 7 | Depressed depth | $t_2$ | mm | — | — | — | — | — | — | — | 0.37 | 0.37 | 0.37 |
| Mixing conditions of the polymers | 8 | Length of boundary line/cm$^2$ | $\underline{N}(p) \cdot \underline{L}(p)$ | mm | 373 | 450 | 137 | 450 | 710 | 1570 | 290 | 170 | 170 | 170 |
| | 9 | Effective average cord length | L(c) | mm | 0.42 | 0.35 | 1.15 | 0.35 | 0.22 | 0.10 | 0.55 | 0.85 | 0.85 | 0.85 |
| | 10 | Material of the extrusion surface | | | G | C | C | C | C | C | G | C | C | C |
| | 11 | Average length of the partition members | $\bar{L}(w)$ | mm | 2.090 | 2.258 | 2.032 | 2.032 | 2.032 | 1.270 | 2.090 | 2.032 | 2.032 | 2.032 |
| | 12 | Theoretical block number | $\bar{N}o(B)$ | | 3.5 | 4.2 | 1.9 | 3.9 | 5.6 | 7.3 | 2.9 | 2.2 | 2.2 | 2.2 |
| | 13 | Total fiber-forming area | $\underline{S}o$ | cm$^2$ | 78 | 78 | 32 | 32 | 32 | 16 | 32 | 32 | 32 | 32 |
| | 14 | Average distance between extrusion openings | p | mm | 0.285 | 0.443 | 0.399 | 0.399 | 0.399 | 0.249 | 0.285 | 0.399 | 0.399 | 0.399 |

TABLE 1-continued

| | | | | | | | | | | | | | | |
|---|---|---|---|---|---|---|---|---|---|---|---|---|---|---|
| | 15 | Average hill height | $\bar{h}$ | mm | 0.168 | 0.153 | 0.142 | 0.142 | 0.142 | 0.084 | 0.168 | 0.142 | 0.142 | 0.142 |
| | 16 | Average hill width | $\bar{d}$ | mm | 0.169 | 0.277 | 0.269 | 0.269 | 0.269 | 0.162 | 0.169 | 0.269 | 0.269 | 0.269 |
| | 17 | $\bar{h}/\bar{d}$ | | — | 0.994 | 0.552 | 0.528 | 0.528 | 0.528 | 0.518 | 0.994 | 0.528 | 0.528 | 0.528 |
| | 18 | Opening area ratio | $(\bar{p}-\bar{d})/\bar{p}$ | — | 0.407 | 0.375 | 0.325 | 0.325 | 0.325 | 0.349 | 0.407 | 0.325 | 0.325 | 0.325 |
| Fiberizing conditions | 19 | Extruder temperature | — | °C. | 260-310 | 240-280 | 240-320 | 200-310 | 200-310 | 200-310 | 200-310 | 280-320 | 240-320 | 240-320 |
| | 20 | Die temperature | — | °C. | 270-280 | 250-260 | 270-280 | 250-280 | 250-280 | 250-280 | 250-280 | 260-280 | 260-280 | 260-280 |
| | 21 | Amount of extrusion (A + B) | W | g/min | 100 | 100 | 73 | 75 | 78 | 38 | 77 | 80 | 69 | 69 |
| | 22 | Velocity of cooling air | V(y) | m/sec | 12 | 11 | 10 | 9 | 11 | 9 | 11 | 11 | 10 | 10 |
| | 23 | Take up speed | V(l) | cm/min | 400 | 400 | 1000 | 2700 | 3000 | 2500 | 1000 | 1500 | 350 | 350 |
| | 24 | Total denier | ΣDe | de | 225,000 | 225,000 | 65,700 | 25,000 | 23,400 | 13,700 | 69,500 | 48,000 | 173,600 | 173,600 |
| | 25 | Solidification length | P(s) | cm | 0.26 | 0.27 | 0.24 | 0.22 | 0.21 | 0.19 | 0.27 | 0.23 | 0.24 | 0.25 |
| | 26 | Packing fraction | PF | — | $2.70 \times 10^{-3}$ | $2.70 \times 10^{-3}$ | $1.82 \times 10^{-3}$ | $6.75 \times 10^{-4}$ | $6.08 \times 10^{-4}$ | $7.39 \times 10^{-4}$ | $1.82 \times 10^{-3}$ | $1.22 \times 10^{-3}$ | $5.40 \times 10^{-3}$ | $5.40 \times 10^{-3}$ |

TABLE 2

| | | Items | | Unit | Example-1 | Example-2 | Example-3 | Example-4 | Example-5 | Example-6 | Example-7 | Example-8 | Example-9 | Example-10 |
|---|---|---|---|---|---|---|---|---|---|---|---|---|---|---|
| Properties of the undrawn fibers | 1 | Average denier of monofilament | $\overline{De}$ | de | 30 | 9.5 | 8.0 | 0.9 | 10 | 6.5 | 10.6 | 7.2 | 4.1 | 8.6 |
| | 2 | Content of non-circular fibers | | % | >95 | >95 | >95 | >95 | >95 | >90 | >95 | >95 | >95 | >95 |
| | 3 | Content of side-by-side fibers | | % | >65 | >65 | >90 | 100 | 100 | >95 | 100 | >90 | >90 | >90 |
| | 4 | Average number of blocks in the assembly | $\overline{N}$(B) | — | 4.5 | 4.7 | 3.2 | 4.0 | 5.5 | 3.3 | 12.8 | 4.0 | 3.2 | 3.8 |
| | 5 | Theoretical average number of blocks | $\overline{No}$(B) | — | 4.0 | 4.5 | 2.8 | 4.6 | 5.0 | 3.7 | 11.0 | 4.0 | 2.8 | 3.5 |
| | 6 | Intra-assembly block number variation coefficient | CV(AB) | — | 0.41 | 0.38 | 0.45 | 0.21 | 0.47 | 0.34 | 0.40 | 0.45 | 0.34 | 0.54 |
| | 7 | Intrafilament irregular shape factor | (D/d)F | — | 1.38 | 2.15 | 1.46 | 1.40 | 1.83 | 1.71 | 1.51 | 2.40 | 2.08 | 2.96 |
| | 8 | Intra-assembly irregular shape factor | (D/d)A | — | 1.40 | 2.27 | 1.43 | 1.42 | 1.91 | 1.75 | 1.53 | 2.42 | 2.00 | 3.05 |
| | 9 | Maximum difference in intra-filament irregular shape factor | DIF | — | 0.30 | 0.62 | 0.35 | 0.25 | 0.41 | 0.70 | 0.43 | 1.63 | 0.78 | 1.86 |
| | 10 | Intrafilament cross-sectional area variation coefficient | CV(F) | — | 0.28 | 0.26 | 0.19 | 0.27 | 0.32 | 0.24 | 0.28 | 0.29 | 0.18 | 0.30 |
| | 11 | Intra-assembly cross-sectional area variation coefficient | CV(A) | — | 0.32 | 0.35 | 0.27 | 0.31 | 0.46 | 0.27 | 0.31 | 0.41 | 0.21 | 0.42 |
| | 12 | Strength | ST | g/de | 1.4 | 1.2 | 1.3 | 1.2 | 1.3 | 1.3 | 0.9 | 1.1 | 1.2 | 1.2 |
| | 13 | Elongation | EL | % | 113 | 110 | 160 | 150 | 155 | 160 | 140 | 150 | 155 | 150 |
| Drawing conditions | 14 | Method | | — | cold drawing | cold drawing | cold drawing | hot plate drawing | hot bar drawing | hot bar drawing | hot bar drawing | hot bar drawing | hot bar drawing | hot bar drawing |
| | 15 | Temperature | | °C. | 20 | 20 | 20 | 80 | 80–120 | 80–120 | 80–120 | 80–120 | 80–120 | 80–120 |
| | 16 | Draw ratio | | | 3.0 | 3.0 | 3.0 | 3.0 | 3.5 | 3.5 | 3.5 | 3.5 | 3.5 | 3.5 |
| Properties of the drawn fibers | 17 | Average denier of monofilament | $\overline{De}$ | de | 14.3 | 4.5 | 5.8 | 0.4 | 3.6 | 2.4 | 37.6 | 2.5 | 1.5 | 3.1 |
| | 18 | Intrafilament irregular shape factor | (D/d)F | | 1.95 | 2.31 | 2.45 | 1.41 | 2.15 | 1.68 | 1.48 | 2.41 | 2.11 | 2.87 |
| | 19 | Maximum difference in intra-filament irregular shape factor | DIF | | 0.71 | 0.64 | 0.41 | 0.33 | 0.45 | 0.65 | 0.41 | 1.61 | 0.65 | 1.56 |
| | 20 | Intrafilament cross-sectional area variation coefficient | CV(F) | | 0.29 | 0.26 | 0.21 | 0.29 | 0.30 | 0.26 | 0.29 | 0.31 | 0.19 | 0.37 |
| | 21 | Intra-assembly cross-sectional area variation coefficient | CV(A) | | 0.33 | 0.35 | 0.28 | 0.31 | 0.44 | 0.29 | 0.33 | 0.38 | 0.20 | 0.43 |
| | 22 | Strength | ST | g/de | 2.5 | 2.7 | 2.8 | 3.0 | 3.0 | 3.0 | 2.5 | 2.3 | 2.9 | 2.7 |
| | 23 | Elongation | EL | % | 16 | 23 | 34 | 28 | 32 | 35 | 38 | 43 | 41 | 40 |
| | 24 | Number of crimps after heat treatment | Ns | per inch | 6.2 | 9.1 | 7.3 | 16.8 | 7.2 | 7.2 | 4.8 | 12.6 | 9.8 | 13.5 |
| Splitting method | | | | | cold drawing | cold drawing and water treatment | — | — | Crumpling | — | — | — | — | — |

| | | Items | | Unit | Example-11 | Example-12 | Example-13 | Example-14 | Example-15 | Example-16 | Example-17 | Example-18 | Example-19 |
|---|---|---|---|---|---|---|---|---|---|---|---|---|---|
| Properties of the undrawn fibers | 1 | Average denier of monofilament | $\overline{De}$ | de | 7.1 | 5.3 | 2.3 | 1.8 | 0.9 | 6.0 | 3.7 | 13.5 | 13.8 |
| | 2 | Content of non-circular fibers | | % | >90 | >90 | >90 | >90 | >90 | >95 | >95 | >95 | >95 |
| | 3 | Content of side-by-side fibers | | % | >95 | >65 | >95 | 100 | >100 | >85 | >90 | >90 | >85 |
| | 4 | Average number of blocks in the assembly | $\overline{N}$(B) | — | 4.4 | 1.6 | 3.3 | 5.1 | 6.4 | 2.4 | 2.1 | 2.2 | 2.1 |
| | 5 | Theoretical average number of blocks | $\overline{No}$(B) | — | 4.2 | 1.9 | 3.9 | 5.6 | 7.3 | 2.9 | 2.2 | 2.2 | 2.2 |
| | 6 | Intra-assembly block number | CV(AB) | — | 0.36 | 0.41 | 0.38 | 0.34 | 0.28 | 0.49 | 0.22 | 0.19 | 0.25 |

TABLE 2-continued

| | | | | | | | | | | | | | |
|---|---|---|---|---|---|---|---|---|---|---|---|---|---|
| | | variation coefficient | | | | | | | | | | | |
| | 7 | Intrafilament irregular shape factor | (D/d)F) | — | 1.31 | 1.53 | 1.60 | 1.51 | 1.48 | 2.87 | 1.45 | 1.46 | 1.43 |
| | 8 | Intra-assembly irregular shape factor | (D/d)A | — | 1.39 | 1.56 | 1.63 | 1.54 | 1.52 | 3.11 | 1.47 | 1.51 | 1.49 |
| | 9 | Maximum difference in intra-filament irregular shape factor | DIF | — | 0.42 | 0.41 | 0.43 | 0.39 | 0.38 | 1.67 | 0.35 | 0.41 | 0.37 |
| | 10 | Intrafilament cross-sectional area variation coefficient | CV(F) | — | 0.25 | 0.29 | 0.27 | 0.22 | 0.24 | 0.29 | 0.21 | 0.24 | 0.22 |
| | 11 | Intra-assembly cross-sectional area variation coefficient | CV(A) | — | 0.29 | 0.33 | 0.30 | 0.26 | 0.29 | 0.31 | 0.24 | 0.25 | 0.29 |
| | 12 | Strength | ST | g/de | 1.3 | 1.2 | 1.2 | 1.2 | 1.2 | 1.2 | 1.2 | 1.2 | 1.2 |
| | 13 | Elongation | EL | % | 160 | 110 | 180 | 170 | 180 | 180 | 230 | 170 | 165 |
| Drawing conditions | 14 | Method | | — | hot bar drawing | hot plate drawing | hot plate drawing | hot plate drawing | hot plate drawing | hot plate drawing | hot plate drawing | hot plate drawing | hot plate drawing |
| | 15 | Temperature | | °C. | 80-120 | 120-145 | 110-135 | 120-145 | 110-135 | 120-145 | 120-150 | 95-120 | 95-120 |
| | 16 | Draw ratio | | | 3.5 | 3.0 | 3.0 | 3.0 | 3.0 | 3.0 | 3.0 | 3.0 | 3.0 |
| Properties of the drawn fibers | 17 | Average denier of monofilament | $\overline{De}$ | de | 2.5 | 2.2 | 1.0 | 0.8 | 0.4 | 02.6 | 1.4 | 4.7 | 4.8 |
| | 18 | Intrafilament irregular shape factor | (D/d)F | | 1.42 | 1.55 | 1.58 | 1.49 | 1.53 | 2.76 | 1.43 | 1.42 | 1.39 |
| | 19 | Maximum difference in intra-filament irregular shape factor | DIF | | 0.44 | 0.39 | 0.46 | 0.37 | 0.38 | 1.58 | 0.37 | 0.35 | 0.38 |
| | 20 | Intrafilament cross-sectional area variation coefficient | CV(F) | | 0.26 | 0.28 | 0.26 | 0.25 | 0.21 | 0.30 | 0.23 | 0.21 | 0.20 |
| | 21 | Intra-assembly cross-sectional area variation coefficient | CV(A) | | 0.30 | 0.31 | 0.31 | 0.27 | 0.27 | 0.39 | 0.26 | 0.24 | 0.25 |
| | 22 | Strength | ST | g/de | 3.0 | 3.1 | 3.2 | 3.1 | 3.2 | 2.4 | 3.2 | 3.0 | 2.9 |
| | 23 | Elongation | EL | % | 41 | 35 | 43 | 38 | 45 | 51 | 48 | 45 | 53 |
| | 24 | Number of crimps after heat treatment | Ns | per inch | 7.1 | 9.5 | 11.9 | 14.3 | 17.6 | 14.5 | 9.7 | 8.6 | 9.1 |
| Splitting method | | | | | — | — | — | — | — | — | — | — | — |

What we claim is:

1. A process for producing an assembly of many fibers, which comprises:

(1) extruding a molten macroblend composed of many molten phases of at least two dissimilar fiber-forming polymers through a mesh spinneret, said mesh spinneret having many small openings defined by partitioning members of small width having elevations and depressions on at least one surface thereof and having an opening area ratio of 0.1 to 0.8, the function of said small openings being that the polymer melt extruded through one small opening of the spinneret can move toward and away from the polymer melt extruded from another small opening adjacent to said one opening or vice versa through depressions of the partitioning members, the elevated and depressed surface of the spinneret being a polymer extruding side, and said molten macroblend to be extruded having a phantom cross-section taken parallel to the spinneret, in which there exist many effective continuous boundary lines between the molten phases of dissimilar polymers each of which lines has a length larger than one-fourth of the length of a partitioning member which defines one small opening in the spinneret, whereby said many boundary lines are cut with the partitioning members in the spinneret, and (2) taking up the extrudates from the small openings while cooling them by supplying a cooling fluid to the extrusion surface of said spinneret or to its neighborhood, whereby said extrudates are converted into numerous separated fine fibrous streams and solidified.

2. The process of claim 1 wherein the cord length ($\bar{L}(c)$) represented by the following equation $$\bar{L}(c) = \frac{\pi}{2\bar{N}(p) \cdot \bar{L}(p)}$$

defined by the average length [($\bar{L}(p)$)] and number [$\bar{N}(p)$] of the continuous effective boundary lines between the different molten polymer phases is controlled by means of a static mixer to be used, and the average length [$\bar{L}(w)$] of the partitioning members which defines one small opening of the spinneret is controlled by means of a mesh spinneret to be used in such a manner as to give an assembly of many fibers containing blocks about one to about 2 times as many as the theoretical number of blocks [$\bar{N}_o(B)$] defined by the following equation $$\bar{N}_o(B) = \frac{\bar{L}(w)}{2\bar{L}(c)} + 1$$

and the many boundary lines between the different molten polymer phases are cut with the partitioning members defining the small openings of the spinneret.

3. The process of claim 1 wherein the coalescing of the polymers is controlled by means of a static mixer to be used so that there exist many effective continuous boundary lines between dissimilar molten polymer phases, each of which lines has a larger length than the length of each partitioning member which defines one small opening in the spinneret.

4. The process of claim 1 wherein at least one of the average length and the number of the said continuous effective boundary lines is controlled by means of a static mixer and a mesh spinneret to be used, whereby the partitioning members defining at least 50% of the entire small openings of the spinneret cut the boundary lines between the dissimlar molten polymer phases.

5. The process of claim 1 wherein at least one of the average length ($\bar{L}(p)$) and the number ($\bar{N}(p)$) of the continuous effective boundary lines between the dissimilar molten polymer phases and the average length ($\bar{L}(w)$) of a partitioning member which defines one small opening of the spinneret are controlled by means of a static mixer and a mesh spinneret to be used so as to give an assembly of many fibers which have about 1 to about 2 times as many blocks as the theoretical number ($\bar{N}_o(B)$) defined by the following formula $$\bar{N}_o(B) = \frac{\bar{L}(w) \cdot \bar{N}(p) \cdot \bar{L}(p)}{100\pi} + 1$$

and many boundary lines between the dissimilar molten polymers are cut by the partitioning members defining the small openings of the spinneret.

6. The process of claim 1 wherein the average length and number of the continuous effective boundary lines between the molten polymer phases in a cross section of the molten macroblend taken parallel to the spinneret are controlled by mixing at least two dissimilar molten polymer phases of a static mixer, and the mixed state of the molten polymer phases which have left the static mixer is maintained until said molten polymer phases reach the spinneret.

7. The process of claim 1 wherein in a cross section of the molten macroblend taken parallel to the spinneret, at least one molten polymer phase extends long continuously with a small width.

8. The process of claim 1 wherein in a cross section of the molten macroblend taken parallel to the spinneret, at least one molten polymer phase is of a lamellar structure.

9. The process of claim 1 wherein a cooling fluid is supplied to the melt extrusion surface of the spinneret or to its vicinity so that the solidification length (P(S)), which denotes the distance over which a fine polymer stream leaving the surface of an elevation in the spinneret travels until it is solidified, becomes not more than 2 cm.

10. The process of claim 1 wherein the fine fibrous streams are taken up at a packing fraction (PF), as defined in the specification, of from $10^{-4}$ to $10^{-1}$.

11. A process for producing a drawn assembly of many fibers, which comprises drawing the assembly of many fibers obtained by the process of claim 1.

12. A process for producing an assembly of many fibers which comprises drawing the assembly of many fibers obtained by the process of claim 1, and then heat-treating the drawn assembly.

* * * * *